US011667075B2

(12) United States Patent
Lampalzer

(10) Patent No.: US 11,667,075 B2
(45) Date of Patent: Jun. 6, 2023

(54) APPARATUS AND METHOD FOR SELECTIVE LASER MELTING AND/OR LASER SINTERING OF POWDERY MATERIAL

(71) Applicant: Ralf Lampalzer, Witten (DE)

(72) Inventor: Ralf Lampalzer, Witten (DE)

(*) Notice: Subject to any disclaimer, the term of this patent is extended or adjusted under 35 U.S.C. 154(b) by 357 days.

(21) Appl. No.: 16/593,021

(22) Filed: Oct. 4, 2019

(65) Prior Publication Data

US 2020/0139622 A1 May 7, 2020

(30) Foreign Application Priority Data

Oct. 4, 2018 (DE) .......................... 102018007812.5
Oct. 4, 2018 (DE) .......................... 102018007813.3

(51) Int. Cl.
*B29C 64/153* (2017.01)
*B29C 64/245* (2017.01)
*B29C 64/255* (2017.01)
*B22F 12/30* (2021.01)
*B22F 12/00* (2021.01)
*B29C 64/259* (2017.01)
(Continued)

(52) U.S. Cl.
CPC ............ *B29C 64/153* (2017.08); *B22F 10/28* (2021.01); *B22F 12/30* (2021.01); *B22F 12/38* (2021.01); *B29C 64/245* (2017.08); *B29C 64/255* (2017.08); *B29C 64/259* (2017.08); *B33Y 10/00* (2014.12); *B22F 10/73* (2021.01)

(58) Field of Classification Search
CPC ... B29C 64/153; B29C 64/259; B29C 64/245; B29C 64/255; B22F 12/38; B22F 12/30
See application file for complete search history.

(56) References Cited

U.S. PATENT DOCUMENTS 10,279,544 B2 * 5/2019 Kanda .................... B33Y 10/00
2011/0252618 A1 * 10/2011 Diekmann ............. B29C 67/04
29/401.1
(Continued)

FOREIGN PATENT DOCUMENTS

CN 107262717 A 10/2017
DE 102009020987 A1 11/2010
(Continued)

OTHER PUBLICATIONS

Search Report in corresponding European Patent Application No. 19201563.4, dated Mar. 5, 2020, with English Translation.

*Primary Examiner* — Jacob T Minskey
*Assistant Examiner* — Adrien J Bernard
(74) *Attorney, Agent, or Firm* — Edell, Shapiro & Finnan, LLC

(57) ABSTRACT

In an apparatus for selective laser melting and/or laser sintering with a mounting base, that has at least one chamber, wherein the at least one chamber is a building chamber and/or a powder reservoir chamber for a powder, the saving of powder results in an increase in the possible uses of the apparatus, in that the apparatus further comprises at least one fitting element, wherein in operation, the at least one fitting element is located in the at least one building chamber, wherein in a first configuration the at least one fitting element is vertically movable relative to the main body and in a second configuration the at least one fitting element is fixedly connected to the mounting base.

13 Claims, 15 Drawing Sheets

(51) Int. Cl.
    *B33Y 10/00*     (2015.01)
    *B22F 10/28*     (2021.01)
    *B22F 10/73*     (2021.01)

(56) References Cited

U.S. PATENT DOCUMENTS

2018/0126458 A1     5/2018   Choi
2018/0222117 A1     8/2018   Herzog
2018/0339466 A1*  11/2018  El Naga ................ B22F 1/145

FOREIGN PATENT DOCUMENTS

| | | |
|---|---|---|
| DE | 202010005162 U1 | 11/2010 |
| DE | 102010004035 A1 | 7/2011 |
| DE | 102013226670 A1 | 6/2014 |
| DE | 102013227010 A1 | 6/2015 |

* cited by examiner

APPARATUS AND METHOD FOR SELECTIVE LASER MELTING AND/OR LASER SINTERING OF POWDERY MATERIAL

CROSS REFERENCE TO RELATED APPLICATIONS

This application claims foreign priority under 35 U.S.C. § 119(a)-(d) to German Application No. 102018007812.5 filed on Oct. 4, 2018, and German Application No. 102018007813.3 filed on Oct. 4, 2018, the entire contents of which are hereby incorporated by reference.

TECHNICAL FIELD

The present invention relates to an apparatus for selective laser melting and/or laser sintering with a mounting base having at least one chamber, wherein the at least one chamber is a building chamber and/or a powder reservoir chamber, wherein the apparatus further comprises at least one fitting element, wherein in operation, the at least one fitting element is located in the at least one chamber. More particularly, the present invention relates to a method and apparatus for adapting chamber geometry in selective laser melting or selective laser sintering.

BACKGROUND

Selective Laser Melting (SLM) or Selective Laser Sintering (SLS) is a generative manufacturing process. In the method, the material to be processed is applied in powder form in a thin layer on a building plate. The powdery material (also referred to as "the powder") is locally melted on the surface (by SLS) or locally melted completely (by SLM) by electromagnetic radiation (in particular laser radiation) and forms a solid layer of the material after solidification This cycle is repeated until all the layers have been locally melted on the surface or locally melted completely. The finished workpiece is cleaned of the excess powder and can then be used.

Possible powdery materials are powdered metals (copper, steel, cobalt-chromium, titanium, tungsten, aluminum, gold) and other substances (glass, ceramic, plastic).

An advantage of the method is that even very hard materials (cobalt-chromium, titanium) can be processed, when alternative methods (e.g. milling) are less economical because of high tool wear on hard materials.

An installation for SLM or SLS (hereinafter referred to as "installation") includes as its important components a computing and evaluation unit, an irradiation unit, a mirror deflection unit and a coater.

The invention is particularly concerned with the coater or a corresponding apparatus for selective laser melting and/or laser sintering.

The task of the coater is to lower the building plate and then the uniform and planar application of a new powder layer.

Such a coater according to the prior art is shown in FIG. 1.

FIG. 1 shows a top view of the coater (bottom left). In this top view, two intersecting planes (13a, b) are shown. Furthermore, in FIG. 1 each at top left and top right a sectional view can be seen. The top left sectional view refers to the intersecting plane (13a) of the top view. The sectional view on the top right refers to the intersecting plane (13b).

The coater has a building chamber (3) and often has a powder reservoir chamber (3). The footprint of the building chamber and accordingly the footprint of the powder reservoir can be seen in top view.

The building chamber and possibly the powder reservoir chamber always have vertical walls. The "footprint of the building chamber" or "footprint of the powder reservoir" is understood to mean the projection of the building chamber into the X-Y plane, the "height of the building chamber" or "height of the powder reservoir" is its extension in Z direction. The maximum height of a producible workpiece is given by the height of the building chamber minus the thickness of the building plate.

The building chamber and possibly powder reservoir chamber are laterally limited by a partition wall, transverse walls and longitudinal walls. The partition, the transverse walls and the longitudinal walls form a rigid frame, which is referred to as "mounting base" (10).

Powder is added by the application of a powder layer of the powdery material (6) (hereinafter also referred to as "powder") in the building chamber.

The generative manufacturing process of a workpiece proceeds in several cycles. In each cycle, the application of a powder layer (1) from the powder (6) takes place in the building chamber. During this process, the bottom element of the building chamber (5) is lowered for each layer. Frequently, the bottom element of the powder reservoir (4) is raised accordingly. The lowering and lifting is usually done with linear stages, which are usually mounted below the bottom elements of the building chamber or the powder reservoir.

The powder layer is applied by means of a doctor blade (8), which during the primary movement of the doctor blade (15) pushes and moves forward a powder accumulation (7) for the next layer and deposits it in the building chamber. In addition to the primary movement of the doctor blade, there is a secondary movement of the doctor blade, which serves to return the doctor blade back to its original position.

In other prior art coaters, the bottom element of the reservoir is not raised but a quantity of powder is discharged from a metering screw. The powder falls onto a collecting plane where it is caught by the doctor blade and deposited in the building chamber.

The process is hereinafter referred to as "powder transfer" or "transfer". It refers to exactly one cycle and one powder layer.

In the process of doctor blade powder transfer, small amounts of powder may be excessive. They are placed with the doctor blade in a powder overflow vessel (11). After over-sweeping the powder overflow vessel, the doctor blade reverses and returns to the cycle start point beyond the powder reservoir or beyond the zone from which powder falls from the metering screws.

The lower edge of the doctor blade passes over an area called "motion area" (18) at each cycle.

The melting takes place in the uppermost powder layer (1) of the building chamber. Below this are one or more workpieces already partially built and embedded in powder (14) on the building plate (12).

After the workpiece or the workpieces are completed, they are removed from the building chamber, together with the building plate. The size of the building chamber is crucial for the maximum possible size of the workpieces.

Thereafter, the workpiece is separated from the building plate. In addition, the remaining loose powder is removed from the building chamber. This remaining powder is contaminated by splashes of the formerly liquid material with larger particles.

The powder is usually either fed to a recycling company, where again fine powder is produced, or it is screened.

In the case of screening, the fine powder component falling through the sieves can be stored under exclusion of oxygen and reused in a later generative manufacturing process. The sieved-out larger powder particles only are sent to the recycling company.

FIG. 2 shows a highly simplified representation, which will be the basis for the further explanations: It shows only the mounting base (10), the building chamber (3), the powder reservoir chamber (2), the motion area (18) and the cut-out for the powder overflow vessel.

As X-dimension, also "length" (numeral 24 in FIG. 1) is referred to the spatial direction parallel to the feed motion direction of the doctor blade. However, the considerations are not limited to a linearly moving doctor blade. In the case of a circularly moving doctor blade, X has the character of an (azimuthal) angle (numeral 24 in FIG. 14). All considerations can also be applied to a circularly moving doctor blade.

As the Y-dimension, also as "width" (numeral 25 in FIG. 1), the horizontal dimension is perpendicular to the feed motion direction. In the case of a circular movement of the doctor blade Y is the radial coordinate (numeral 25 in FIG. 14).

The vertical direction is called Z dimension (height) (26).

The aim of the invention is the adaptation of the shape of the footprint of the building chamber of a coater for SLS or SLM to the one or more workpieces to be built.

At the same time, the height of the building chamber should not be or only to a very limited extent be impaired if the footprint of the building chamber is adjusted, so that the production possibilities are not or only to a limited extent limited in height.

The adaptation of the shape of the footprint of the building chamber has the following advantages:

The amount of powder required for a generative manufacturing process and the amount of the remaining loose powder in the building chamber is reduced. This leads to
  For expensive materials to reduce the capital lockup in powder cost. An example is gold powder.
  To a lower circulation of powder, which is in many cases returned to a recycling plant and must be purchased again, this results in a cost savings.
  less stock of powder, resulting in lower storage costs and lower risk in case of theft of expensive stored powder
  To a reduced workload in the removal of the workpiece and during screening, because less loose powder remains in the building chamber and must be removed from there and sieved.

There is a cost savings in the building plates because building plates of smaller area can be used.

The speed of the generative manufacturing process increases in some configurations.

A numerical example for the quantification of the effects is given at the end of the description.

The challenge of the present invention is to avoid the disadvantages of the prior art, and to develop an apparatus of the type mentioned in such a way that in the process of selective laser melting and/or laser sintering powder can be saved and the economic application spectrum of the apparatus can be increased.

SUMMARY

The solution of this objective is achieved in an apparatus of the type mentioned in that in a first configuration, the at least one fitting element is vertically movable relative to the mounting base and in a second configuration, the at least one fitting element firmly connected to the mounting base, and is preferably not movable. Furthermore, the problem is solved by an appropriate use of such a fitting element and a corresponding method.

The chamber is in particular the building chamber or the powder reservoir chamber of an apparatus for selective laser melting and/or laser sintering. In the first configuration, the fitting element in the first configuration is movable and preferably not movable in the second configuration. In the first configuration, preferably a firm connection of the fitting element to a bottom element (of a building chamber and/or powder reservoir) is carried out; hence it can be moved with that. As it will be explained in more detail below (see in particular the exemplary embodiment according to item I and in FIGS. 15a to 15b), the at least two configurations can be used to reduce the size of the building chamber (and/or the powder reservoir chamber), which is a simple and cost effective way to save powder. The required conversion between the two configurations is also very simple, since the at least one fitting element preferably only has to be connected differently. In this case, one and the same fitting element can be connected differently; but it is also conceivable that another accordingly shaped fitting element in the other configuration/mode is used or rather connected. It is also particularly advantageous that the fitting element is installed in both configurations/operating modes in the apparatus. The fitting element has a dual functionality with respect to the chamber (e.g., building chamber or powder reservoir chamber). The invention is preferably used for the building chamber and the powder reservoir chamber together, since a reduction (or enlargement) of the building chamber a corresponding reduction (or enlargement) of the powder reservoir chamber is advantageous. However, it can also be used for example only for the building chamber, e.g. if there is no powder reservoir chamber, if, for example, the powder is provided through a metering screw or similar.

Furthermore, it is preferred that an upper side of the at least one fitting element in the intended mounting position forms a bottom surface of the chamber in the first configuration. More preferably, the fitting element constitutes a part of the bottom element in addition to the actual bottom element of the (building) chamber, i.e. to the core element of the bottom element of the (building) chamber, and it is preferably connected to this. The fitting element is moved in this case by the vertical drive of the bottom element, to which the fitting element is fixed in the first configuration, and serves to enlarge the chamber.

Advantageously, in the second configuration, in the intended mounting position, a lateral side of the at least one fitting element forms a lateral wall of the chamber. In the second configuration, the fitting element is no longer part of the bottom element but forms one (or more) walls, e.g. side walls of the (building) chamber and it is firmly connected to the main body or rather the mounting base of the apparatus. In the second configuration, therefore, the size of the chamber is reduced.

Preferably, in the second configuration, the bottom element of the chamber is vertically movable relative to the at least one fitting element. The at least one fitting element is firmly connected in this configuration with the main body or rather mounting base.

Preferably, the chamber is the building chamber, wherein the at least one fitting element comprises a vertical gap in the second configuration in the intended mounting position, which is provided for the removal of the excess powder. The fitting element has a dual functionality in the second configuration in this embodiment; it serves as a wall e.g. of the building chamber and thus ensures its reduction in size and at the same time it provides a possibility to drain the powder, which can be provided much closer to the building chamber. In this way, the way the doctor blade has to travel in one pass decreases, thereby greatly reducing manufacturing times.

Furthermore, it is preferred that the at least one fitting element in the first configuration comprises no vertical gap. The gap can be covered in the first configuration by a lid or closed by a closure. It is also contemplated by the invention that, by a change in the orientation of the fitting element the vertical gap "disappears" in the first configuration, i.e. no longer forms an opening on the surface of the apparatus. Another possibility is that the gap in this configuration is covered by the building plate, whereby it is also closed.

According to a structurally particularly advantageous embodiment of the invention, the intended mounting position of the at least one fitting element in the first configuration has a different orientation of the at least one fitting element than the orientation of the same in the intended mounting position of the second configuration. This results in a simple change between the configurations with reduction of the number of required constructional elements. For example, the fitting element may be shaped so that in one position it is jammed to the core element of the bottom element of the building chamber, but in a differently oriented mounting position it is jammed to the mounting base and thus firmly connected in each case. By way example, the asymmetry of the fitting element can be so low that it is not visible to the naked eye.

It is also advantageous that the mounting base forms the walls of the chamber in the first configuration. In this configuration, a large building chamber and/or powder reservoir chamber is intended.

According to a further preferred embodiment, the at least one fitting element forms at least one wall of the chamber in the second configuration. This wall is used to reduce the size of the chamber and preferably forms a smaller building chamber in this configuration with other walls of the mounting base.

Advantageously, in the intended mounting position, the apparatus has a secondary vertical gap, which is provided in the first configuration for removing the excess powder.

Preferably, the first and secondary gaps are located at such side of the building chamber, to be opposite to the side of the powder reservoir or of another type of powder delivery apparatus, such as e.g. a metering screw. The doctor blade then moves in the first configuration up to the secondary gap and in the second configuration until only up to the gap formed in the fitting element, which gap is e.g. is located substantially closer to the building chamber than the secondary gap.

Advantageously, the apparatus further comprises a powder collecting container, which is located below the first and the secondary gap. In this way, a single powder container for the apparatus can be provided, which is used in both configurations/modes, regardless of the gap through which the powder is drained. As a result, the structure of the apparatus is simplified and there is no further change in the conversion between the first and second configuration/mode required, which notably saves time and minimizes powder losses. Furthermore, the single powder collecting container can also collect bothersome powder, which may get under the fitting element when changing the configuration due to lack of cleanliness when working. Third, the powder collecting container can also take up powder in a special cleaning mode of the system, in which all the fitting elements are removed for the purpose of cleaning and both, the mounting base and the core element of the bottom element of the building chamber, which is detached in this case, are cleaned with a brush or something similar. In the explanation following item A, several other ways will be mentioned as powder falls into the collection container, for example, by production-related gaps between fixed fitting element and the mounting base and the core element of the bottom element of the building chamber.

For simple conversion or reconfiguration of the apparatus between the configurations, it is preferred that in the first configuration, the bottom element of the building chamber can be driven out vertically above the mounting base. This facilitates the attachment or mounting or removal of the fitting element to or from the bottom element of the building chamber. The vertical movement up to the height of the mounting base is required for the operation of the apparatus; moving beyond this height, for example over a distance corresponding to the dimensions of the fitting element, allows easy conversion or reconfiguration of the apparatus between the two configurations.

In the method according to the invention for selective laser melting and/or laser sintering, the following steps are preferred:
Producing a first workpiece in the first configuration by means of laser melting and/or laser sintering;
Reconfiguring or rebuilding the apparatus from the first configuration to the second configuration; and
Producing a second workpiece in the second configuration by means of laser melting and/or laser sintering.

BRIEF DESCRIPTION OF THE DRAWINGS

Further advantageous embodiments of the present invention will become apparent from the following detailed description and from the appended claims. In the drawings, the same or similar reference numerals designate the same or corresponding elements. All described and/or illustrated features alone or in any meaningful combination form the subject matter of the present invention, regardless of their combination in the claims or their dependency. In the drawings:

DETAILED DESCRIPTION

Adaptation of the Building Chamber Geometry

Item A of the summary (at the end of the description) concerns a coater for SLM or SLS, in which various building chambers can be configured.

The term "configure" refers to a system changeover or system adjustment before the start of the generative manufacturing process. This changeover or adjustment can be done manually or automatically.

N denotes the number of building chambers that can be configured. N is greater than or equal to two.

One possibility of an automatic conversion is that a coater, for example, has motor-adjustable walls of the building chamber. By motorized adjustment of these walls, the building chamber can be configured, so enlarged or reduced. The motor adjustment takes place before the beginning of the generative manufacturing process.

Another possibility of the configuration is to use fitting elements for the building chamber. A fitting element is a rigid body of a particular shape, supplied together with the machine.

Figure 3:
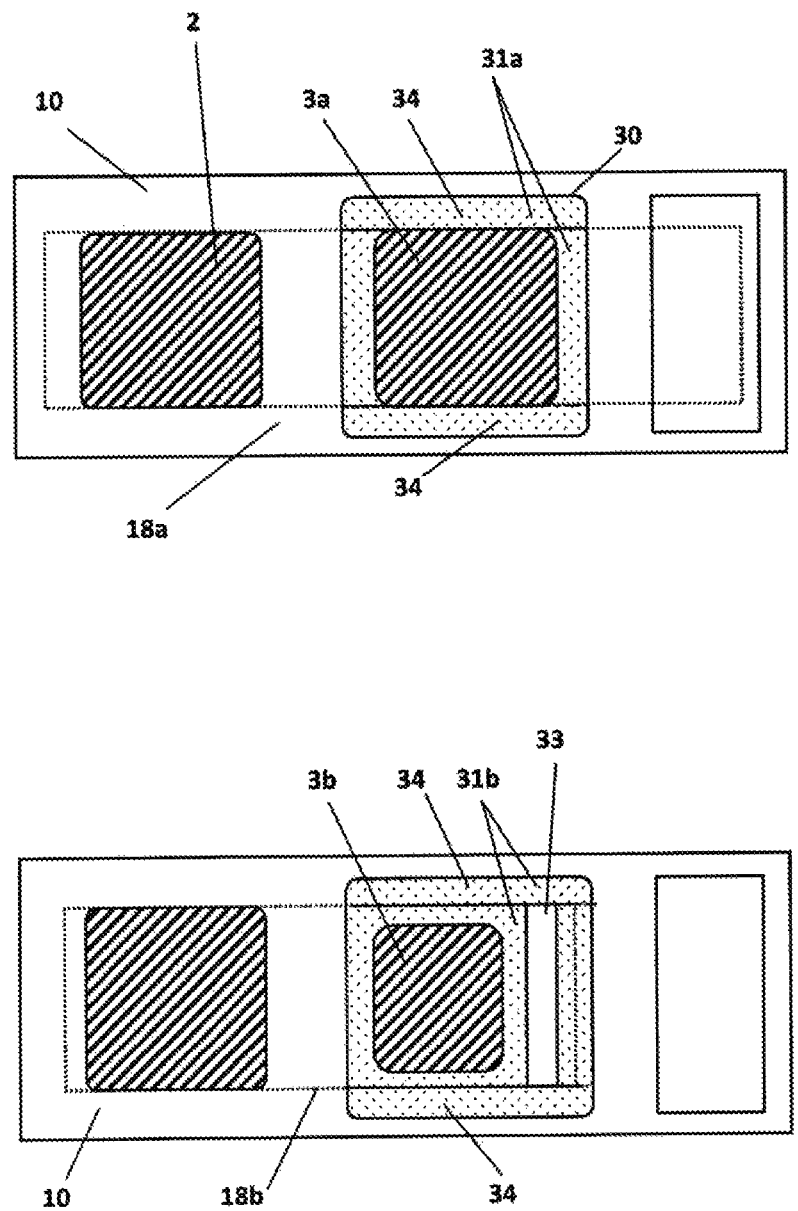
FIG. 3 shows a mounting base, powder reservoir chamber, building chambers, fitting element for the building chamber according to item D.

The mounting base has a cut-out for the building chamber (30), which is greater than or equal to the space defined by the walls of the building chamber. In FIG. 3, as an example, the changes according to the invention were shown when a fitting element for the building chamber is used.

In the upper illustration, a fitting element A (31a) for the building chamber is shown, whose inner walls form the building chamber 1 (3a).

In the lower illustration, a fitting element B (31b) for the building chamber is shown, whose inner walls form the smaller building chamber 2 (3b).

By inserting a fitting element for the building chamber the size of this cut-out for the building chamber is reduced. The fitting element for the building chamber preferably has an inner cut-out, which preferably corresponds to the side walls (the edge) of a building chamber. The fitting element for the building chamber completely or partially edges (=forms the edge) the building chamber. In the example of FIG. 3, the fitting elements for the building chamber completely edge the building chamber. Another example is given under item M; showing fitting elements for the building chamber that only partially edge the building chamber.

There is a cut-out in the mounting base to hold the fitting elements for the building chamber. It is called the cut-out for the building chamber.

In addition, a fitting element for the building chamber preferably has a form closure to the cut-out for the building chamber. In its intended mounting position the fitting element for the building chamber is fixed relative to the cut-out for the building chamber, so it is not moved together with the bottom element of the building chamber.

The state of the fixation relative to the cut-out for the building chamber can be achieved, for example, by screwing on the mounting base, by magnetic attachment, by placing on dowel pins. The fixation can also be done by plugging together the fitting element for the building chamber in the cut-out for the building chamber with a positive locking or by the weight of the fitting element for the building chamber. Alternatively, the fitting element can be connected indirectly, for example with a linear stage to the mounting base, which is not in motion. The linear stage can be controlled, for example, in another configuration so that the fitting element has no relative movement to the likewise moved core element of the bottom element of the building chamber.

To make the coater work, neither powder must not escape from the bottom element of the building chamber nor must the bottom element collide with reduced building chamber walls. This seems difficult given the fact that the cut-out for the building chamber on the one hand has one movable bottom element, on the other hand, the size and shape of the walls of the building chamber is now configurable, so can change.

One of the possibilities of collision avoidance is to move, instead of an object with the function of a bottom element, only a core element of the bottom element of the building chamber (numeral 44 in FIG. 4) with a reduced footprint. This footprint is within the footprint of the building chamber (numeral 3a in FIG. 4) of the smallest building chamber. If this is the case, such a core element of the bottom element of the building chamber will collide with none of the fitting elements for the building chamber in their intended mounting position.

However, in some configurations (except possibly the configuration with the smallest building chamber) powder will leak, because the bottom element does not close tightly.

This problem can be solved, by way of example, by a solution where the tightness against the powder discharge is not ascertained by the bottom element, but by various building plates (numeral 12 in FIG. 4), whose shapes are matched to the corresponding footprint of the building chamber, and can be moved inside the corresponding building chamber with suitable clearance.

However, there is still a problem with leaking powder, even suitable clearance, for example because of the manufacturing tolerances of the components involved or the tolerances arising from the fixation of the fitting element for the building chamber.

In the embodiment of item B of the summary, this problem is solved. It is about a coater according to item A, in which powder falling through gaps in any of the configured building chambers is collected into a powder collecting vessel.

According to the invention, there is a powder collecting vessel located below the building chamber, into which powder which leaks through the gaps will fall. Preferably, this powder collecting vessel can be easily removed, in particular without the fitting element for the building chamber having to be removed.

An additional feature is to implement a deliberate gap in a fitting element for the building chamber between the building chamber and the powder collecting vessel. This extends over the entire width of the building chamber. It serves as a powder trap and thus replaces the powder collecting vessel in this configuration. The gap must be sufficiently wide, so that all the powder falls through it into the powder collecting vessel.

An example of a deliberate gap is shown in FIG. 3. There, the intentional gap has the numeral 33. When using an intentional gap, the motion area (18*a* and 18*b*) can be diminished. That is to say the primary movement of the doctor blade can be reversed to go back to the cycle start point already after sweeping over the deliberate gap and not after sweeping over the powder overflow vessel. This reduces the travel distance and, assuming a constant travel speed, the travel time of the doctor blade. The travel time of the doctor blade is part of the total duration required for the generative manufacturing process, which is thus advantageously accelerated overall. To increase the effect, a size-reduced building chamber should not be centered in the middle of the former larger building chamber, but be located as close as possible to the powder reservoir. The gap between building chamber and powder overflow vessel should also be located as close as possible to the building chamber.

Another embodiment is shown under item C.

The embodiment according to item B is advantageous because only this allows an implementation using fitting elements. The intentional gap is also advantageous because it allows for a significant time savings when small building chambers are used.

The embodiment according to item C describes a coater according to item B, wherein the powder collecting vessel is the only active powder collecting vessel with the coater.

Figure 1:
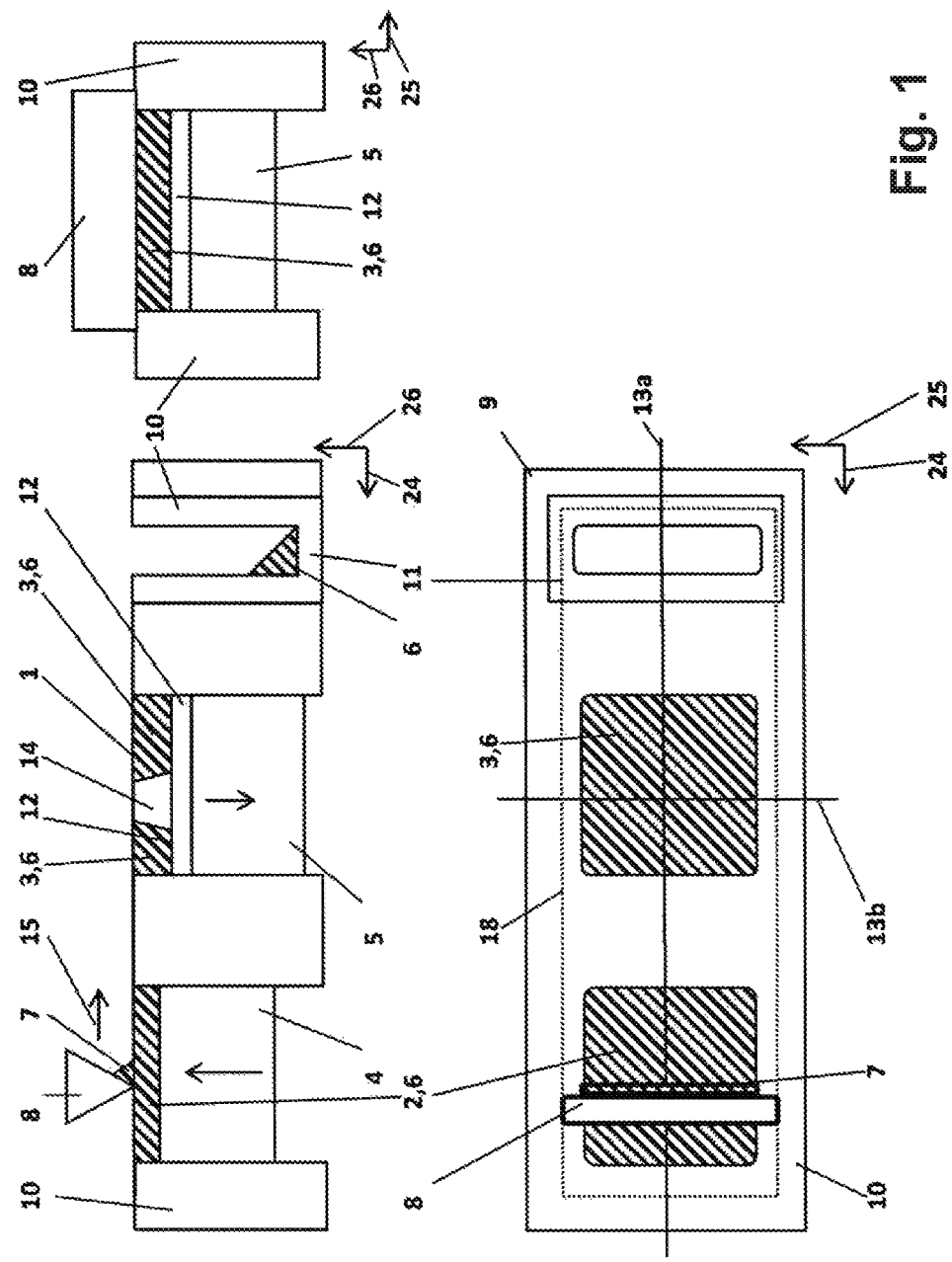
FIG. 1 shows a coater according to the prior art.
Figure 4:
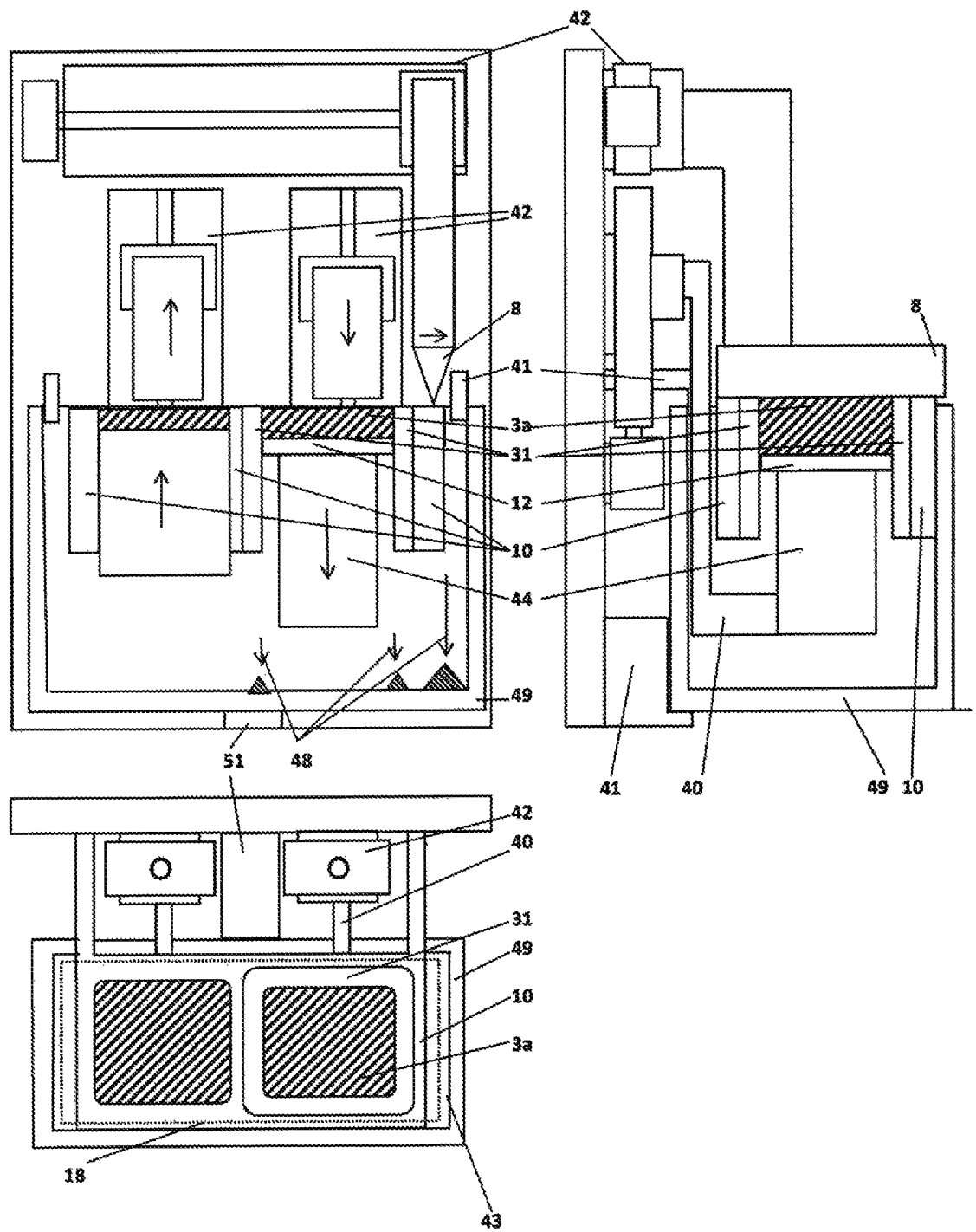
FIG. 4 shows an embodiment of the present invention for the embodiment according to item C.

An example of this embodiment is shown in FIG. 4. Drawing orientations and sectional views are corresponding to the representation of FIG. 1. Here, a relatively large powder collecting vessel (49) is combined with the powder overflow vessel (11 in FIG. 1) required in the coater; it is the same vessel. The vessel is below the outer edges of the mounting base and, to accommodate the falling powder, has a width that exceeds the width of the mounting base. This creates a powder trap (43), in which the excess powder is drained by the doctor blade.

Powder, which is still on the doctor blade (8) after passing over the building chamber (3), falls through the powder trap (43) into the powder collecting vessel. The linear stage and the associated motors (42) for moving the bottom element of the building chamber are preferably not located below the bottom element, but placed laterally aside of to the mounting base; The motor forces are transmitted to the bottom element of the building chamber with the aid of suitable elbow connectors (40). As a result, all components below the bottom element are insensitive to falling powder (48), which could fall from the gap between the fitting element (31) for the building chamber and the building plate (12) or from the gap between the cut-out for the building chamber (30) and the fitting element for the building chamber, Furthermore, the path of the falling powder is not disturbed by motors, gears or cables, so that the powder cannot be deposited there. The powder collecting vessel is easy to remove. In the example of FIG. 4 there is a hook retainer system (41) for taking out the powder collecting vessel after a generative manufacturing process. The process is even simpler than using a powder overflow vessel (11) according to FIG. 1. Also, the coater is generally easy to clean from powder, since the mounting base is accessible for cleaning.

A system can be shipped including several powder collecting vessels, of which only one is active. The other powder collecting vessels could be used e.g. for storing powder from the previous generative manufacturing process and could be in a held by their hooks in a floor unit.

Furthermore, the description of the invention "Coater for selective laser sintering or laser melting" submitted by the same applicant on the same day of the application of this invention is declared to be fully contained in this specification.

The embodiment according to item D describes a coater according to one or more of items A-C, which has a cut-out for the building chamber whose footprint is larger than that of the largest building chamber and in which the configuration is carried out using fitting elements for the building chamber, which stand still relative to the mounting base of the coater in the intended mounting position.

As shown in FIG. 3 and already explained, there is for each building chamber (3*a*, 3*b*) at least one fitting element (31*a*, 31*b*) for the building chamber. In the example of FIG. 3, the number of configurable building chambers N is equal to 2 and there are two fitting elements for the building chamber.

An advantage of this embodiment is that mounting of the fitting elements to the mounting base can be done in areas (numeral 34 in FIG. 3) outside the travel range of the doctor blade. This leads to the possibility of mounting even with upstanding fasteners, e.g. snaps, cylinder head bolts. Also, fasteners can be used which should not be contaminated with powder because e.g. upon ingression of powder, the position of the fitting element for the building chamber would be altered.

Another (not shown in FIG. 3) embodiment of the attachment consists in a "chained attachment". Here, fitting element #2 for the building chamber will fit and exhibit form closure to the fitting element #1 for the building chamber. The fitting element no. 1 for the building chamber would not be removed, but serves as a connection between the mounting base and the fitting element no. 2 for the building chamber.

The embodiment according to item E describes a coater according to one or more of items A-C, In which the configuration is carried out using fitting elements for the building chamber, which stand still in the intended mounting position relative to the mounting base of the coater In which the configuration of the largest building chamber no fitting element is used In this embodiment, there are N building chambers, and preferably N−1 fitting elements for the building chamber. The cut-out for the building chamber is identical to the largest building chamber, which is referred to as building chamber no. 1.

Figure 5:
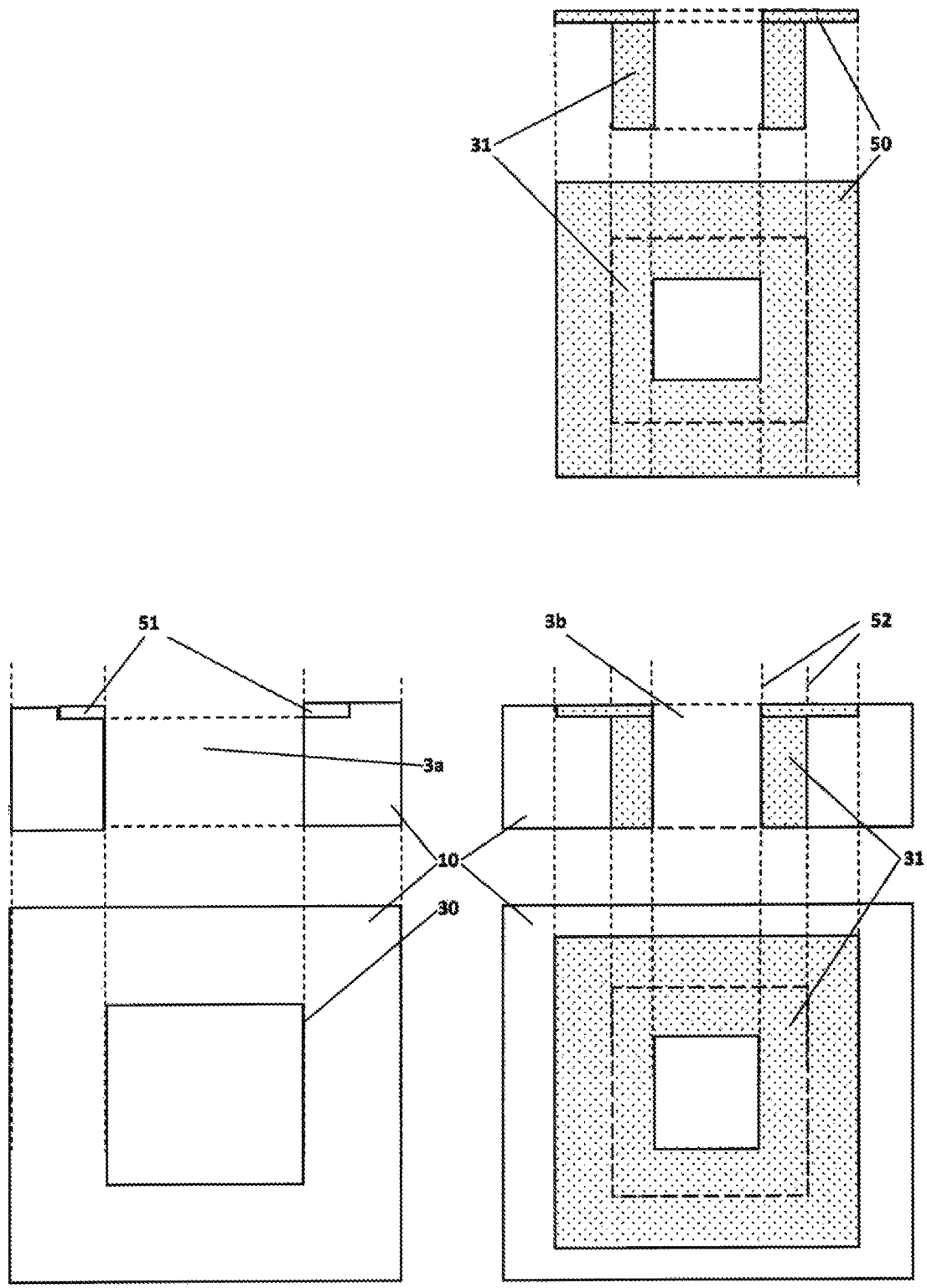
FIG. 5 shows an embodiment of the present invention for a building chamber according to item E.

An exemplary building chamber for this purpose is shown in FIG. 5. Here is N=2, so there is only one fitting element for the building chamber (31), which is shown right above in side view and immediately below in top view. The lines (52) serve to illustrate the drawing between side view and top view.

At the bottom left, the cut-out for the building chamber (30) can be seen, which in this case itself forms a building chamber (3*a*). This building chamber is arbitrarily referred to as building chamber number 1.

At the bottom right, it is shown by which way the fitting element for the building chamber (31) is introduced with a positive fit in the cut-out for the building chamber (30) and which way it is attached to the mounting base (10). This way, building chamber no. 2 (3*b*) is formed.

In the example of FIG. 5, the attachment is made with a form closure, which does not prevent the fitting element for the building chamber from a vertical movement. Auxiliary, a retainer (50) of the fitting element for the building chamber becomes part of the fitting element for the building chamber, and via the aid of it, the form closure is completed.

Fixation is done for example by gravity, by clamping or by using countersunk screws, which are screwed from above through the retainer (50) into the mounting base.

This retainer (50) requires a recess on the mounting base. A compensation element (51) fills this recess when the fitting element for the building chamber is not inserted.

Here we explain the possibilities to assure tightness against leaking powder:

As a result of the consideration according to item F a coater is introduced, according to one or more of items A-E, wherein the coater has a bottom element, which forms a tightly closing building chamber unit with the largest building chamber and each fitting element for the bottom element of the building chamber forms a tightly closing building chamber unit, together with one of the remaining building chambers, when it is placed on the of the bottom element of the building chamber From now on, we discuss fitting elements that are attached to different locations:

to the mounting base or to the bottom element of the building chamber.

The two groups of fitting elements slide against each other.

The coater of this consideration has a bottom element (numeral 5 in FIG. 7), which is designed for the largest building chamber (building chamber no. 1).

The term "tightly closing building chamber unit" designates a building chamber together with a matching bottom element system of the building chamber. These will only form a tightly closing building chamber unit if their shape matches one another, i.e. the bottom element system of the building chamber must slide up and down in the building chamber with a suitable clearance.

Figure 7:
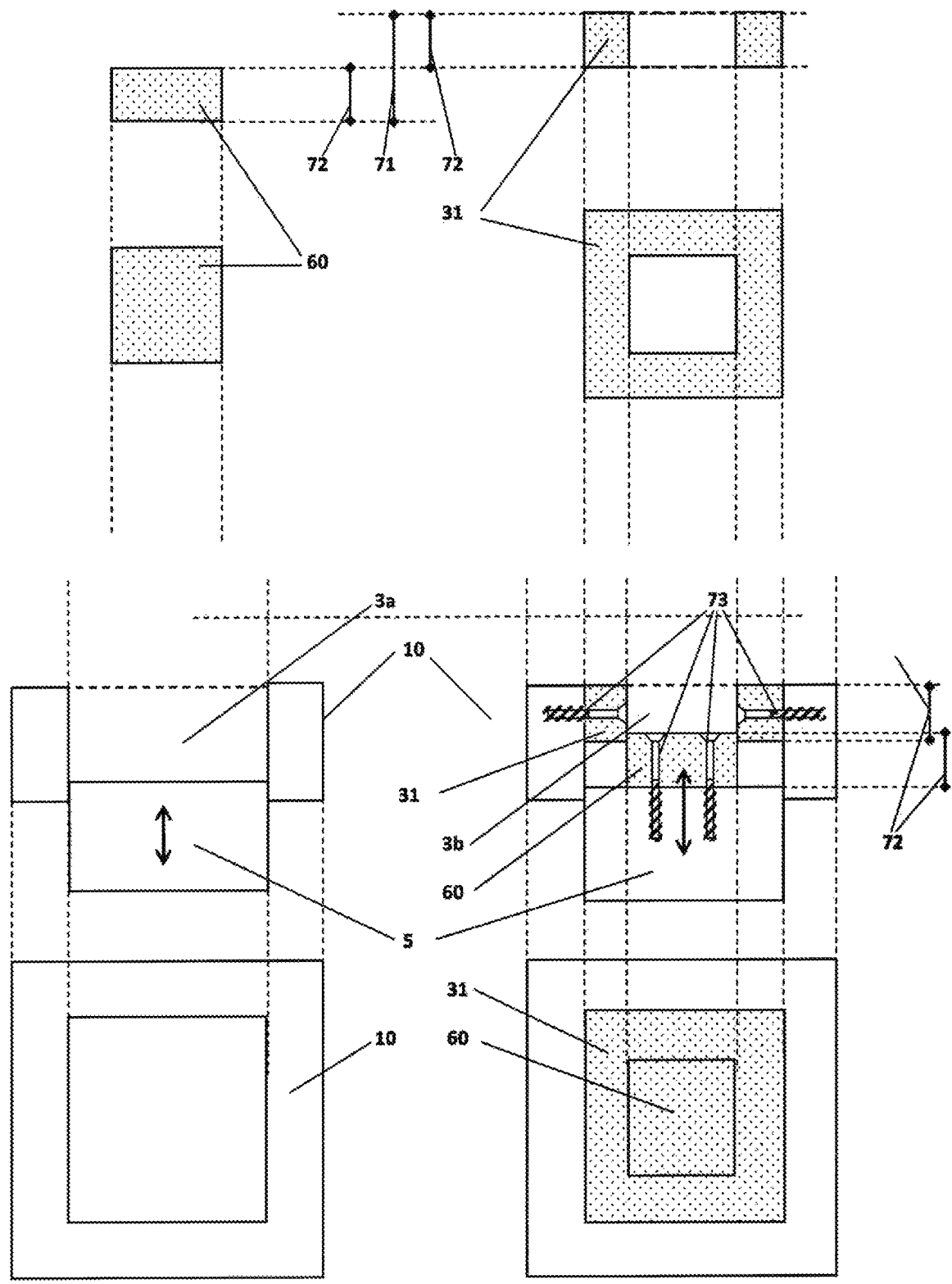
FIG. 7 shows an exemplary embodiment of the present invention for a building chamber unit corresponding to item F and item E.

An example of a building chamber unit corresponding to item F and item E is shown in FIG. 7. In the example, N=2; There is a fitting element for the bottom element of the building chamber and a fitting element for the building chamber. The fitting element for the building chamber (31) is shown at the top right. The fitting element for the bottom element of the building chamber (60) is shown at the top left.

Bottom left, the tightly closing building chamber unit 1 is shown. In the example of FIG. 7, building chamber 1 (3*a*) according to item E is formed solely by the cut-out for the building chamber (30). The coater is ready for operation in the configuration of the building chamber unit 1 without any fitting element.

Bottom right, the tightly closing building chamber unit 2 is shown. Building chamber 2 (3*b*) is formed by the fitting element for the building chamber 1 (31) which is fixed to the mounting base (10). The bottom element system of the building chamber 2 is formed here by the bottom element (5) and the fitting element for the bottom element of the building chamber 1 (60).

In this example, the fitting elements are fastened using screws (73) to the mounting base or to the bottom element.

This configuration is unusual. It would be expected that during the generative manufacturing process the (large) bottom element of the building chamber 1 collides with the fitting element for the building chamber 1, which tightens the size of the building chamber.

A collision of the bottom element (5) with a fitting element for the building chamber (31) during the generative manufacturing process can be avoided by a special measure: The height of the fitting elements for the building chamber and the height of the fitting element for the bottom element of the building chambers result in the sum of the height of the building chamber, preferably in that each of the fitting elements has half the height of the building chamber. The bottom element is moved during the generative manufacturing process only in the vertical interval between the lower end of the building chamber 1 and the lower edge of the fitting elements for the building chamber. This reduces the height of building chambers nos. 2 to N to a maximum of half the height of the building chamber 1. This maximum case is reached if and only if also the height of the fitting elements is half the height of building chamber no. 1.

In the example, there are two building chambers. The height of the building chamber 1 is shown by the numeral 71; half the height with the numeral 72.

In this consideration, there is no core element of the bottom element of the building chamber as described under item A. The reduction of the height of the reduced building chamber is disadvantageous. This coater is in contradiction to the requirement made initially, according to which the height of the building chamber should not be reduced.

The embodiment according to item G describes a coater according to one or more of items A-E, wherein the coater has a core element of the bottom element of the building chamber and different shapes of the bottom element system of the building chamber can be configured by fitting elements of the bottom element of the building chamber which are fixed in the intended mounting position relative to the core element of the bottom element of the building chamber.

According to this embodiment, bottom elements of the building chamber are formed which are adapted to the building chamber. In this case, the core element of the bottom element of the building chamber is supplemented with fitting elements of the bottom element of the building chamber in each case to form a bottom element system.

Exemplary embodiments are shown under items H and I.

In a variant of this embodiment, a bottom element system adapted to the building chamber is formed, wherein the core element of the bottom element of the building chamber is completed with N fitting elements of the bottom element of the building chamber in each case to form N bottom element systems of the building chamber. There is an associated building chamber for each of the N bottom element systems.

The embodiment according to item H describes a coater according to item G, in which the core element of the bottom element of the building chamber forms a tightly closing building chamber unit, together with the smallest building chamber.

In this embodiment there are N building chambers and at least N−1 fitting elements for the bottom element of the building chamber.

The core element of the bottom element of the building chamber itself forms the bottom element of the smallest building chamber. We ticket this building chamber as to be building chamber no. N. Each fitting element for the bottom element of the building chamber, together with the core element of the bottom element of the building chamber forms a tightly closing building chamber unit with one of the remaining (i.e. not with the smallest) building chambers.

Figure 6:
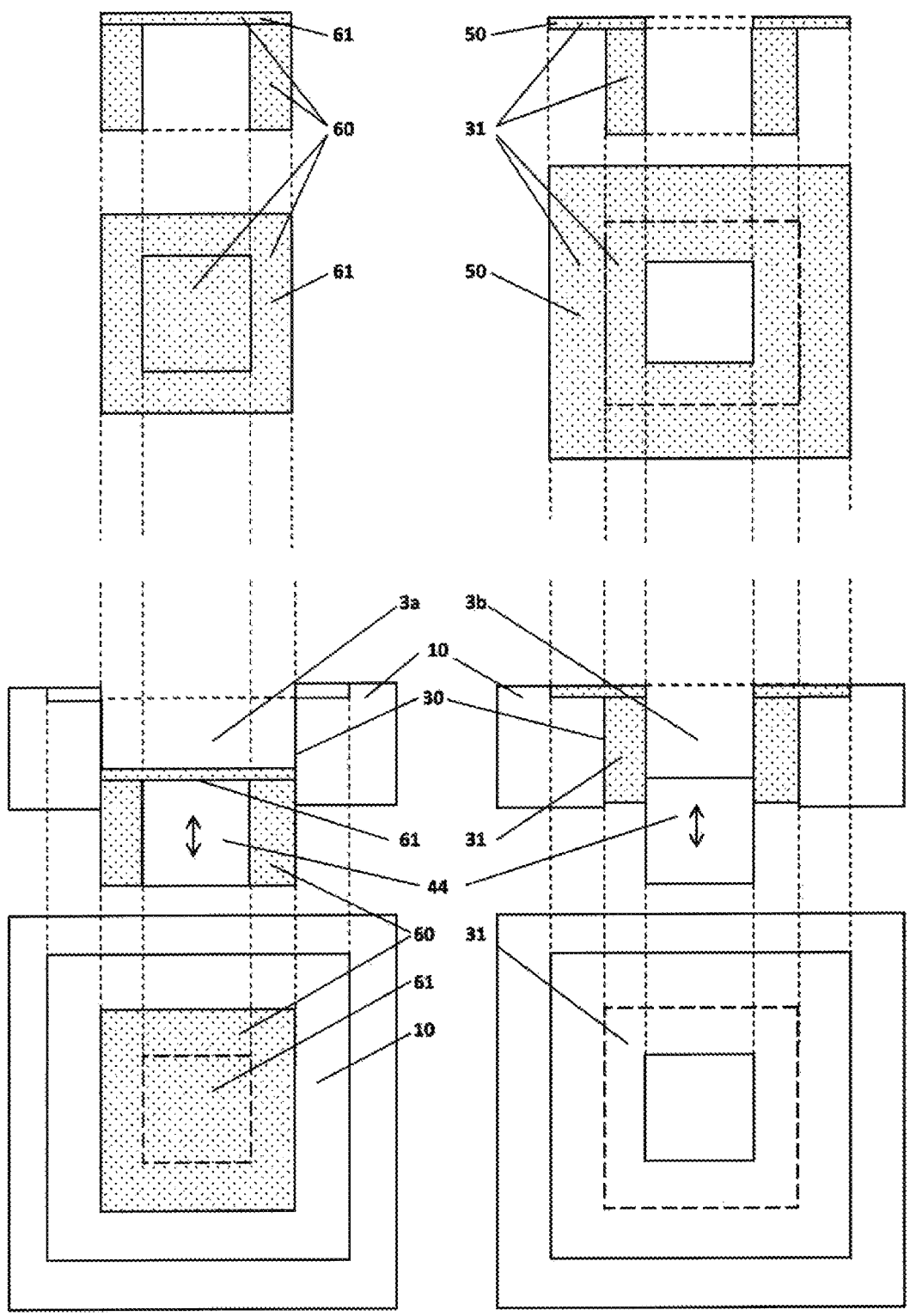
FIG. 6 shows an exemplary embodiment of the present invention for a building chamber unit corresponding to item G and item E.

An example of a building chamber unit corresponding to item G and item E is shown in FIG. 6. Here is N=2, so there is only one fitting element for the building chamber (31), which is shown at the top left and only one fitting element for the bottom element of the building chamber (60), which is shown at the top right.

At bottom left, the tightly closing building chamber unit no. 1 is shown. Building chamber no. 1 (3a) is formed solely by the cut-out for the building chamber (30), because this example it is an embodiment dependent on item E. The bottom element (3a) of the building chamber 1 is formed by the core element of the bottom element of the building chamber (44) in combination with the fitting element for the bottom element of the building chamber (60) mounted to the core element of the bottom element of the building chamber.

At bottom right, the tightly closing building chamber unit no. 2 is shown. Building chamber no. 2 (3b) is formed by the fitting element for the building chamber (31) which is mounted to the mounting base (10). The bottom element (3b) of building chamber no. 2 is formed here alone by the core element of the bottom element of the building chamber (44).

In FIG. 6, not only the mounting of the fitting element for the building chamber is realized using form closure, but also mounting of the fitting element for the bottom element of the building chamber: A retainer to prevent gliding off (61) is also provided as part of the fitting element for the bottom element of the building chamber. As a result, the positive connection is completed.

The mounting is done, like in previous examples, by gravity, by clamping or by using countersunk screws, which are screwed from above through the retainers (50) or (61) into the mounting base or into the core element of the bottom element of the building chamber.

For the generative manufacturing process, the plate thickness of the holder against slipping of the fitting element for the bottom element of the building chamber can be compensated by controlling the core element of the bottom element of the building chamber to be placed lower with some offset during all cycles. The height of this offset corresponds to the plate thickness of the holder.

The embodiment according to item I is a
coater according to item G or H,
wherein at least one of the fitting elements for the building chamber and one of the fitting element for the bottom element of the building chamber is the same element.

In this notably preferred embodiment of the present invention, at least one of the fitting elements in a configuration serves as a fitting element for the building chamber and in another configuration as a fitting element for the bottom element of the building chamber. Such a fitting element is referred to as a "dual function fitting element".

Figure 8:
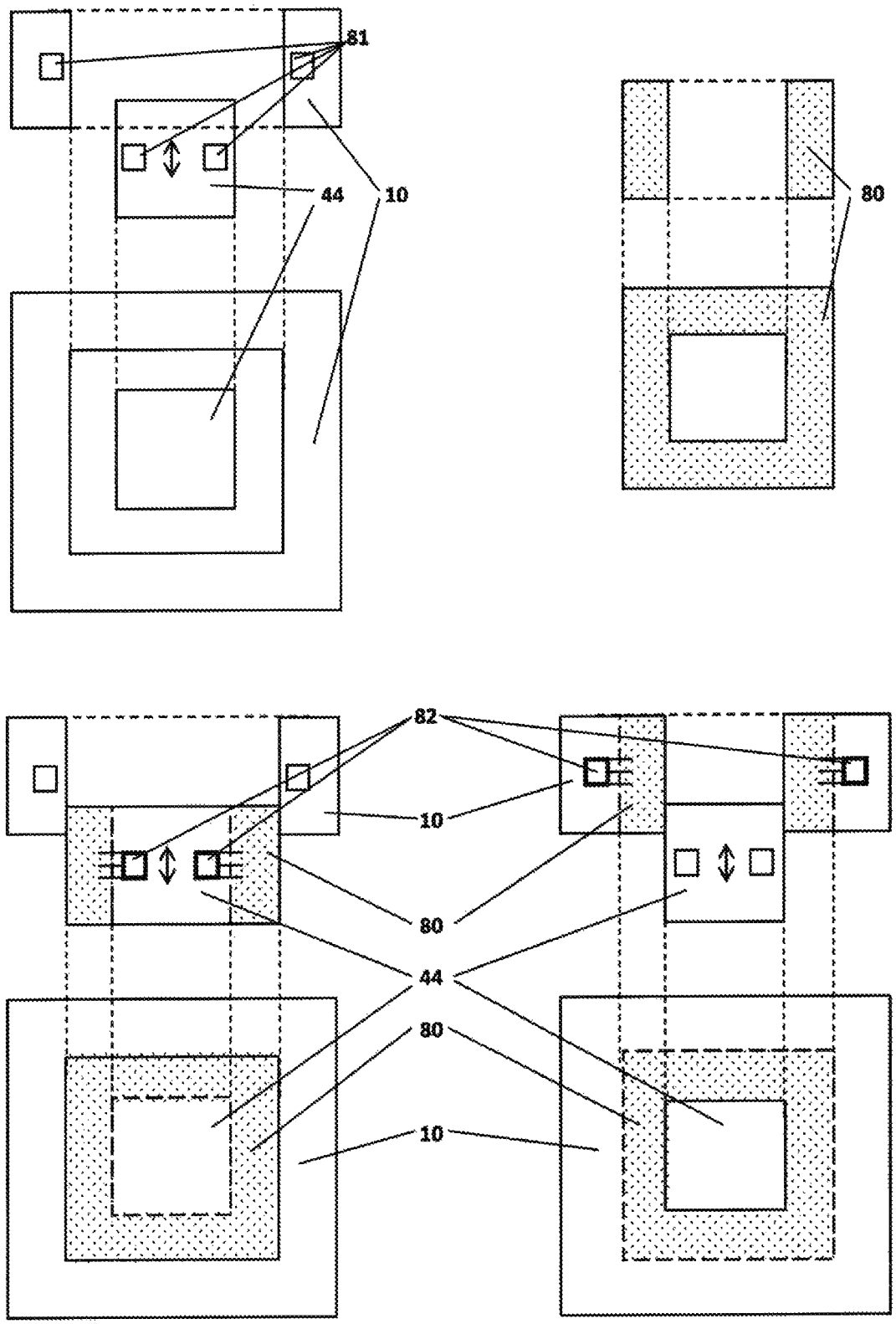
FIG. 8 shows an exemplary embodiment of the present invention for a building chamber unit corresponding to item I, item H and item E.

In FIG. 8, an example of a building chamber unit according to item I, item H and item E is given, when N=2.

At the top left, there is a dual function fitting element (80). In configuration no. 1, which is shown on the bottom left, it serves as a fitting element for the bottom element of the building chamber. In addition, the same fitting element in configuration no. 2, which is shown at the bottom right, serves as a fitting element for the building chamber.

A dual-function fitting element is firmly fixed in one configuration relative to the mounting base and fixed in another configuration relative to the core element of the bottom element of the building chamber.

There are the following options to carry out the attachment of a dual function fitting element:

A Attachment from the Side

To carry out an attachment of a dual function fitting element to the core element of the bottom element of the building chamber or to another dual function fitting element connected to the core element of the bottom element of the building chamber, the core element of the bottom element of the building chamber is preferably driven up, until it is located above the surface of the mounting base. Preferably, there is an upwardly extended actuator Z-track for that purpose. The bottom element is then freely accessible from the side. To attach a dual-function fitting element to the mounting base or then again to any other dual function fitting elements connected to the mounting base, the bottom element is preferably moved to the lower stop so that the inside walls of the mounting base are freely accessible. Thus, the lateral attachment can be done:

A1 By way of example, lateral attachment can be carried out using countersunk screws. For this purpose, suitable bores or threads must be provided in the dual function fitting element, in the core element of the bottom element of the building chamber and in the walls of the mounting base.

A2 A faster-to-use option is shown in FIG. 8. It consists of the dual function fitting element completely or partially made of a ferromagnetic material, for example from iron. In addition, a switchable electromagnet is integrated in the mounting base (10) and another one in the core element of the bottom element of the building chamber (44). An active electromagnet exhibiting flow of electric current is labelled by numeral 82; a non-active electromagnet without current flow is labelled with the numeral 81. If the electromagnet is activated in the mounting base, the dual-function fitting element adheres to the mounting base. (FIG. 8 bottom left) If, on the other hand, the electromagnet is activated in the core element of the bottom element of the building chamber, then the dual function fitting element will adhere to the core element of the bottom element of the building chamber. (FIG. 8 bottom right)

B Attachment by Turning the Fitting Element

The fitting element for the building chamber of FIG. 8 is square and can also be used in rotated position by 90°, 180° and 270°. This possible rotation can be used for attachment to the mounting base or to the core element of the bottom element of the building chamber, e. g. if in the center of two opposite walls of the dual function fitting element cylinder-disks, made of a ferromagnetic material, e.g. from iron, are set in. The cylinder-disks extend from the outside of the dual-function fitting element to its inside. In addition, two opposite walls of the mounting base are each equipped with fixed magnets in their center. Furthermore, two opposite walls of the core element of the bottom element also receive fixed magnets, wherein in a rectangular geometry, those walls are selected which are offset by 90° to those walls of the mounting base that are furnished with cylinder-disks. A dual function fitting element is then fixed by magnetic forces either relative to the mounting base or relative to the bottom element, depending on which 90° rotation it is used.

In the embodiment according to item J is a coater according to one or more of items A-I, wherein at least one of the footprints of the building chamber is customized to the geometry of a workpiece of specified shape.

The phrase "customized shape" is used for a complex shape, not a rectangle, not rectangle with rounded corners, and neither a circular shape.

The term "footprint of a workpiece" refers to the projection of the workpiece onto the X-Y plane.

For example, a manufacturer of wristwatch housings could adapt the shape of the footprint of the building chamber to the footprint of the watchcase.

Below, a way is shown to carry out such an adjustment:

First, the footprint of the workpiece needs to be obtained. This is preferably taken from its CAD data.

Another way to determine the footprint of the workpiece is to physically procure a sample of the workpiece, put it on paper, copy-draw its exterior form on the paper and so get the footprint.

If workpiece areas have a high distance from the paper, the footprint can also be determined by signing the shadow cast by means of a light source positioned vertically high above the object.

Then, the outer edges of the customized footprint need to be determined: These arise preferably by surrounding this copy-drawing from the outside with lines or curved lines, which adjoin one another. In this case, the resulting shape should preferably be convex. Apart from the possible bridging of concave areas, the distances of the lines or curved lines from the copy-drawing should preferably be no more than 25% of the circumference diameter of the shape of the footprint of the workpiece at any point.

This is done in order to be able to produce workpieces similar to the original one, using the same fitting element for the building chamber.

Thus, the customized footprint determined. The design of the footprint of the building chamber is based on this customized footprint.

Figure 9:
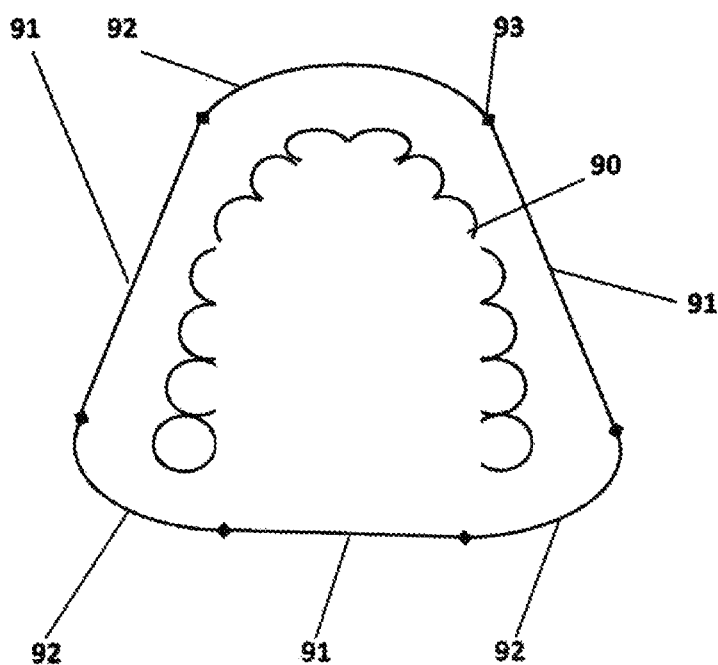
FIG. 9 shows an embodiment of the present invention for determining the customized shape.

FIG. 9 shows by way of example the determination of the footprint of the customized form from a dental jaw model. The footprint of a dental jaw model overlocks the largest workpiece occurring in the dental field and is therefore suitable for SLS or SLM systems in the dental sector for defining the largest building chamber.

To determine a shape customized to the human jaw, the proceeding is as described: A jaw model is placed on paper. The exterior form of the dental arch (90) is drawn all around. The outer edges of the customized footprint are created by encompassing this copy-drawing from the outside with lines (91) or curved lines (92) which adjoin one another. For clarifications, in the figure, there are diamonds (93). added to illustrate the transitions between lines and curved lines. Apart from the concave areas of the copy-drawing, the distances of the lines or curved lines from the contour copy-drawing preferably at no point exceed 25% of the circumference diameter of the copy-drawing.

Supply of Powder

Here we will discuss the supply of powder to the configurable building chamber. It is the object of the invention to reduce the amount of powder needed for a generative manufacturing process. So a building chamber in the transfer process should not be supplied with more powder than necessary, because this powder would only end up in the powder overflow vessel and adversely increases the amount of powder in the reuse process.

Figure 10:
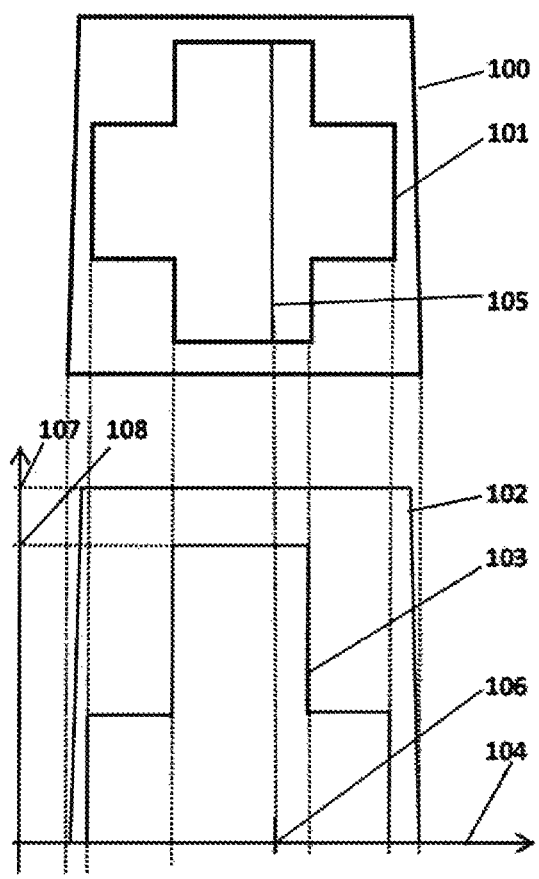
FIG. 10 shows an embodiment of the present invention for a powder requirement function.

As examples, we consider a trapezoid (100) to be the footprint of building chamber no. 1 and a cross shape to be the footprint of building chamber no. 2 (FIG. 10).

The powder is transferred into this trapezoidal shape or cross shape, after the bottom element of the building chamber has slightly lowered its position. This happens when the doctor blade pushes and moves forward a powder accumulation in the X direction.

In the example, there should be a powder reservoir chamber, which is also designed in trapezoidal shape (100). If the building chamber is designed in the same trapezoidal shape, the supply of powder meets the requirement for powder.

In the following, the procedure is explained, if the building chamber has another shape, e.g. cross shape.

In general, we call the function in the Y direction, describing the amount of powder necessary to precisely fill a certain footprint of the building chamber as a powder requirement function P(Y). The integral over Y of the function P(Y) indicates the required powder volume; it is equivalent to the product of the surface area of the footprint of the building chamber with the step dzB of the bottom element of the building chamber. The powder requirement function P(Y) is calculated as the length of the expansion of the building chamber in X direction multiplied by the layer thickness dzB. The length of the expansion in the X direction is measured at a certain value of the Y coordinate (i.e. along the particular line of constant Y value).

As an example, FIG. 10 shows the length (105) of the building chamber no. 2 at location $Y_0$ (106). The powder requirement function of the footprint of the building chamber no. 1 (100) is also shown by the numeral (102) in a coordinate system (104) in which the Y axis points to the right and the powder requirement function points upward. The powder requirement function for the footprint of the building chamber no. 2 (101) is labelled by the numeral 103.

The powder requirement function (103) of the footprint of the building chamber 2 is, as far as it is different from zero, always smaller than the powder requirement function (102) of the footprint of the building chamber 1. It need to be like this, because the footprint of the building chamber 2 (101) is everywhere within the footprint of the building chamber 1 (100); so its length in the x-direction is smaller than the length of the footprint of the building chamber 1 at each location Y.

To supply a building chamber with not too much and not too little powder, the powder requirement function P(Y) is to be set identical to the powder supply function Q (Y). The powder supply function Q(Y) can be interpreted as the amount of powder that the doctor blade pushes and moves forward in a place Y along the doctor blade edge.

Henceforth, the task must be solved to create a powder supply function Q(Y) corresponding to the function P(Y) on the doctor blade, or at least a powder supply function which approximates the function P(Y).

When the powder supply function Q(Y) exceeds the powder demand function at a location Y, the excess powder is scraped into the powder overflow vessel. However, if the powder requirement function exceeds the powder supply function at a location Y, the powder in the corresponding layer is missing and the generative manufacturing process becomes defective. So the powder supply function must not fall below the powder requirement function at any point. Exceeding is relatively unproblematic but not desirable in order not to squeeze too much powder into the powder overflow vessel.

The procedure summarized under item K consists in the
  scaling of the powder supply depending on the building chamber,
  to be applied to a coater according to one or more of items A-J.

One way to provide an approximate powder supply function is to scale the powder supply to a coater:

Typically, a coater has a hardware parameter that multiplies the powder supply function.

Here are two examples:

In case supply of powder is done by using a doctor blade to shift and move powder from a powder reservoir, the cycle feed $dz_v$ of the bottom element of the powder reservoir can be adjusted.

In case supply of powder feed is done by using a dosing screw, the powder supply is scaled by changing the dosing screw rotational feed per cycle.

The scaling is done separately for each building chamber. The multiplicative adaption with a scaling factor is carried out individually for each one, in such a way, that the powder supply function is as small as possible, but does not anywhere fall below the powder requirement function.

The scaling factor can be calculated in the following way: The functions Q(y) and P(y) are tabulated at a large number of nodes $y_i$. The quotients $P(y_i)/Q(y_i)$ are also tabulated, in all places $y_i$ when $Q(y_i)$ is nonzero. The maximum value of these quotients is the sought scaling factor s. The scaled powder supply function is then s * Q(y).

Figure 11:
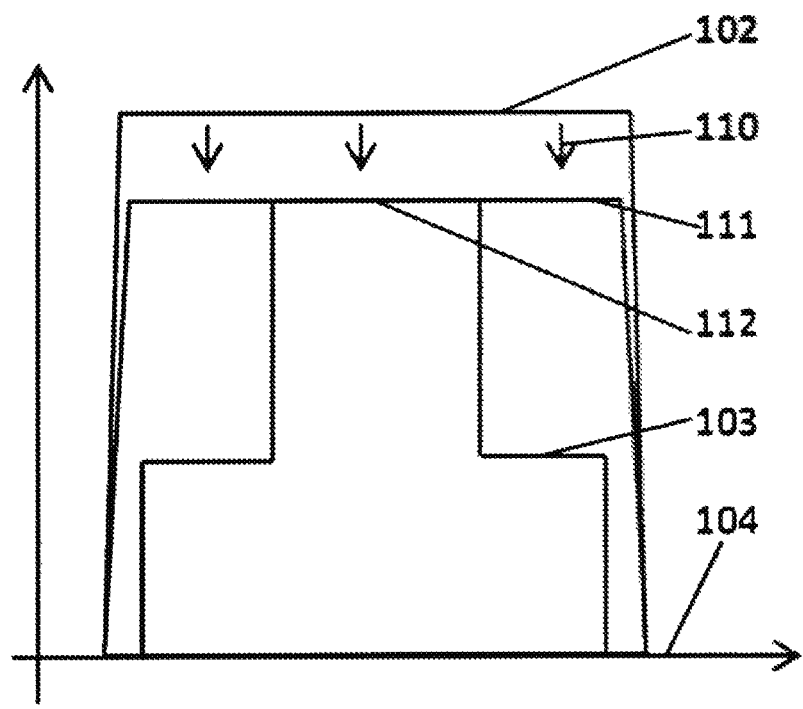
FIG. 11 shows an embodiment of the present invention for scaling the powder supply function.

In FIG. 11, an example of scaling is shown. In this example, the powder reservoir chamber also has the shape of the building chamber no. 1, so it is trapezoidal. The powder supply function Q(y) and the powder requirement function $P_1$(y) are the same for the building chamber 1; Here the best possible condition has already been reached. The powder supply function is shown by numeral 102 in FIG. 11.

In the example, the scaling of the powder supply function Q(y) (102) to the powder requirement function (103) is carried out for the building chamber no. 2 by multiplying Q(y) by a factor s, so that $P_2$(y) is reached or overreached, but never underrun. The function values $Q(y_i)$ and $P_2(y_i)$ are tabulated. These are maximal in the area of the middle plateau (112), because there $P_2$(y) is relatively large. The quotient of the abscissa values in the region of the middle plateau $P_2$ (108) and $Q_1$ (107) has a value of 0.8 in this example, the scaling factor s thus receives this value.

The feed of the bottom element of the powder reservoir $dz_y$ is reduced in comparison to the feed for building chamber no. 1 by the factor s=0.8. This procedure leads to a scaled powder supply function s * Q(y), which is represented by the numeral (111). The proportional downscaling of the function (102) to the scaled powder supply function (111) is expressed symbolically by proportional scaling arrows (110).

An even more exact adaptation of the form of the powder supply function to the powder requirement function compared to the scaling can be achieved by other, more extensive measures:

When using a metering screw for the powder supply, one way to provide an adjusted powder supply function is to control the location of the outlet of the metering screw by moving it in a controlled way in Y direction. The powder outlet of the dosing screw remains longer in areas where the powder requirement function has a high functional value than in areas with a low functional value.

Another way, that is to say the embodiment according to item L, consists in a coater according to one or more of items A-J, in which different footprints of the powder reservoir can be configured.

Analogous to the procedure in the building chamber, in this embodiment, different footprints of the powder reservoir can be configured in order to achieve an intended powder supply function.

In one embodiment, the footprints of the building chamber and footprint of the powder reservoir are set identical, as are the feed rates $dz_v$ and $dz_B$. This has the consequence that the powder supply function is equal to the powder requirement function. In other variants, a scaling is carried out according to item M, and the feeds are adjusted accordingly.

The considerations for the configuration of the building chamber according to item A-J can be transferred to the configuration of the powder reservoir chamber. In particular, Analogously to item B, powder falling out of columns in the powder reservoir chamber can be collected using a powder collecting vessel, Analogously to item B, this powder collecting vessel can be the only powder collecting vessel on the coater, Analogously to item D or E, the configuration can be carried out using fitting elements for the power reservoir, Analogously to item G, different shapes of the bottom element of the powder reservoir can be configured by fitting elements for the bottom element of the powder reservoir attached to a core element of the powder reservoir, Analogously to item I, at least one of the fitting elements for the powder reservoir and one of the fitting elements for the bottom element of the powder reservoirs can be the same element.

Figure 12:
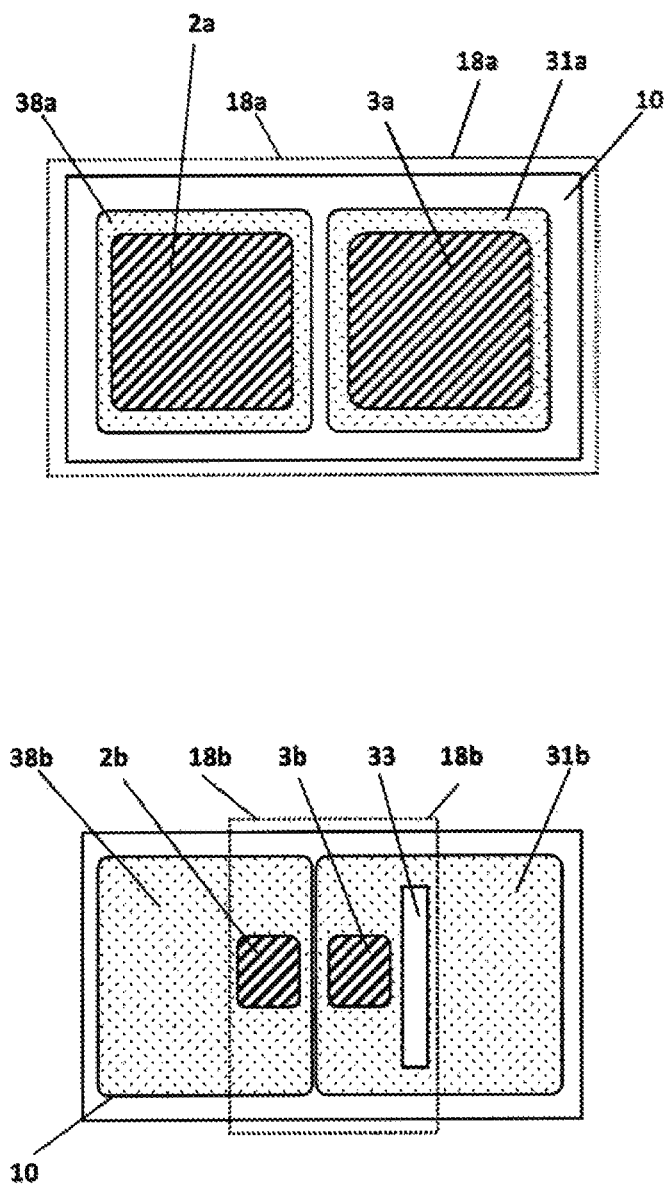
FIG. 12 shows an embodiment of the present invention for a mounting base corresponding to item L, item D and item C.

An example is shown in FIG. 12. In the upper half of the picture, the building chamber no. 1 (31a) and the powder reservoir no. 1 (2a) are configured using fitting element no. 1 (38a) for the powder reservoir; in the lower half of the picture, the building chamber no. 2 (31b) and the powder reservoir no. 2 (2b) are configured using fitting element no. 2 (38b) of the powder reservoir.

If the size of a powder reservoir is reduced as described, this size-reduced powder reservoir should preferably not be centered in the middle of the larger powder reservoir chamber, but as close as possible to the building chamber. This has the advantage that the cycle starting point of the doctor blade can be moved further to the building chamber and thus the motion area (18a and 18b) is further reduced. As a result, the shortened travel path (assuming a constant driving speed) reduces the travel time of the doctor blade, so that, advantageously, all in all the generative manufacturing process will be faster.

A coater with configurable powder reservoir chamber may be simplified. This is the case when, as summarized in item M, in a coater according to one or more of items A-J or L, the powder requirement functions of at least two footprints of the building chambers have constant ratios to each other.

Whenever the powder requirement functions of at least two building chamber footprints are constant in relation to one another, one of the configurations of the footprint of the powder reservoir can be saved. This is true, because the powder requirement functions of two building chamber footprints have constant ratios to each other, it is sufficient if only one of the two building chamber footprints is realized as a corresponding footprint of the powder reservoir. When configuring the other building chamber, powder supply can be obtained with the help of the same powder reservoir chamber by scaling the feed dzy, in the ratio of the two powder requirement functions.

Figure 13:
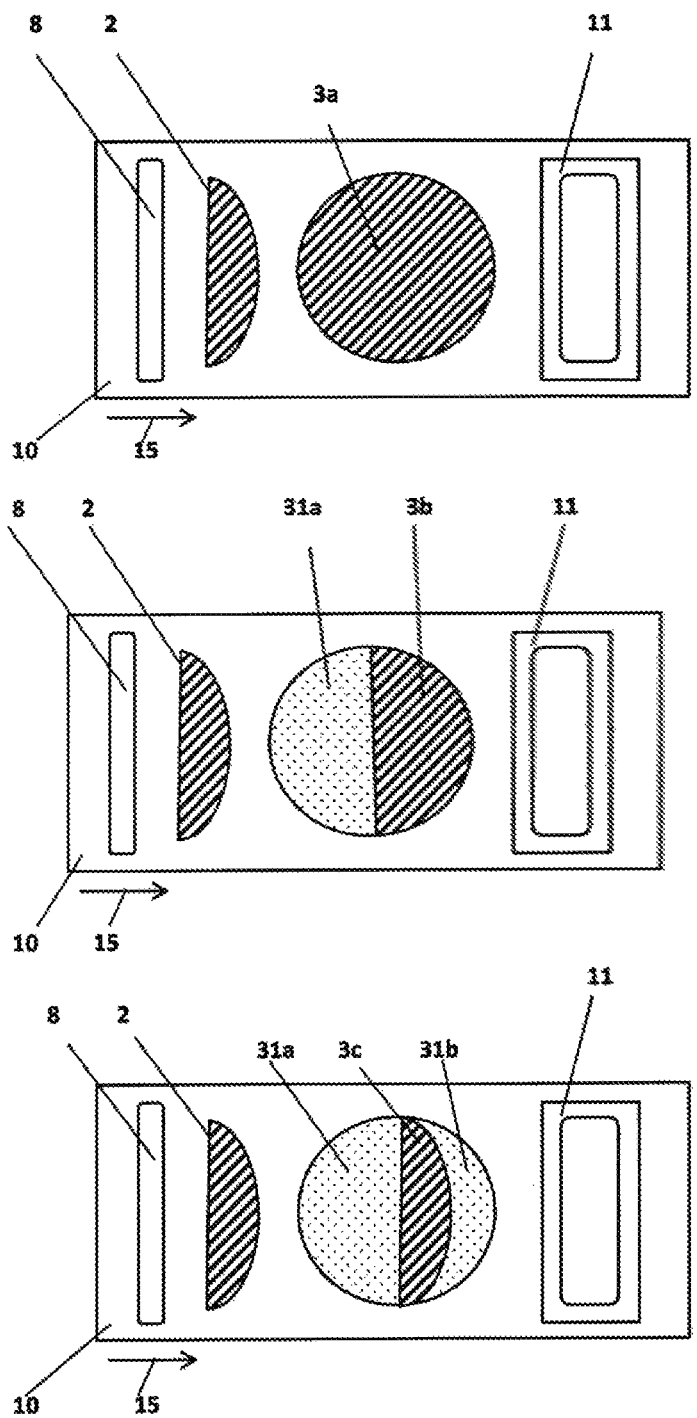
FIG. 13 shows a schematic illustration of an embodiment of the invention for explaining the powder supply when several different footprints of the building chamber are configured.

An Exemplary Embodiment is shown in FIG. 13:

The footprint of the building chamber 1 (3a) is circular,

The footprint of the building chamber 2 (3b) results from the footprint of the building chamber 1 by halving the circle with a section in the Y direction. The powder requirement function of the footprint of the building chamber 2 is half as large as that of footprint of the building chamber 1. The configuration is done with the aid of a fitting element no. 1 shaped like a semicircle.

Building chamber 3 (3c) results from the building chamber 2 by linear compression in X direction by a factor of 0.5. The powder requirement function of the footprint of the building chamber 2 is thus a quarter as large as that of footprint of the building chamber 1. The configuration is done with a fitting element for the building chamber no. 2 (31b) shaped like a sickle, and used additionally to fitting element for the building chamber no. 1.

So, all three powder requirement functions have constant ratios to each other. Accordingly, two configurations for the footprint of the powder reservoir are not needed. The number of the footprints of the powder reservoir is reduced from 3 to 1.

Thus, advantageously, no fitting element for the powder reservoir is necessary. It is sufficient to have only one powder reservoir chamber geometry. The footprint of the bottom element of the powder reservoir realized in the example corresponds to the footprint no. 3 of the bottom element of the building chamber. The configuration no. 2 for footprint of the building chamber no. 2 is operated with a doubling of the feed $dz_V$, the configuration no. 1 to the footprint of the building chamber no. 1 is $dz_V$ with a fourfold increase of the feed.

Transfer of the Considerations Regarding Powder Supply to a Circular Movement of the Doctor Blade The considerations are also applicable in the case of a circular movement of the doctor blade instead of a linear movement. In this case, we transfer the considerations to a non-Cartesian coordinate system whose origin is the circle center point of the doctor blade motion. We define an X coordinate as the azimuthal angular coordinate in this coordinate system, a Y coordinate as the corresponding radial coordinate. The Z coordinate remains unchanged in the vertical direction. The powder supply then takes place along circular sector-shaped arcs instead of lines. Accordingly, the path lengths X in the building chamber for powder delivery and in the powder reservoir for powder intake must be measured as an angle at the center of the rotational movement.

Figure 14:
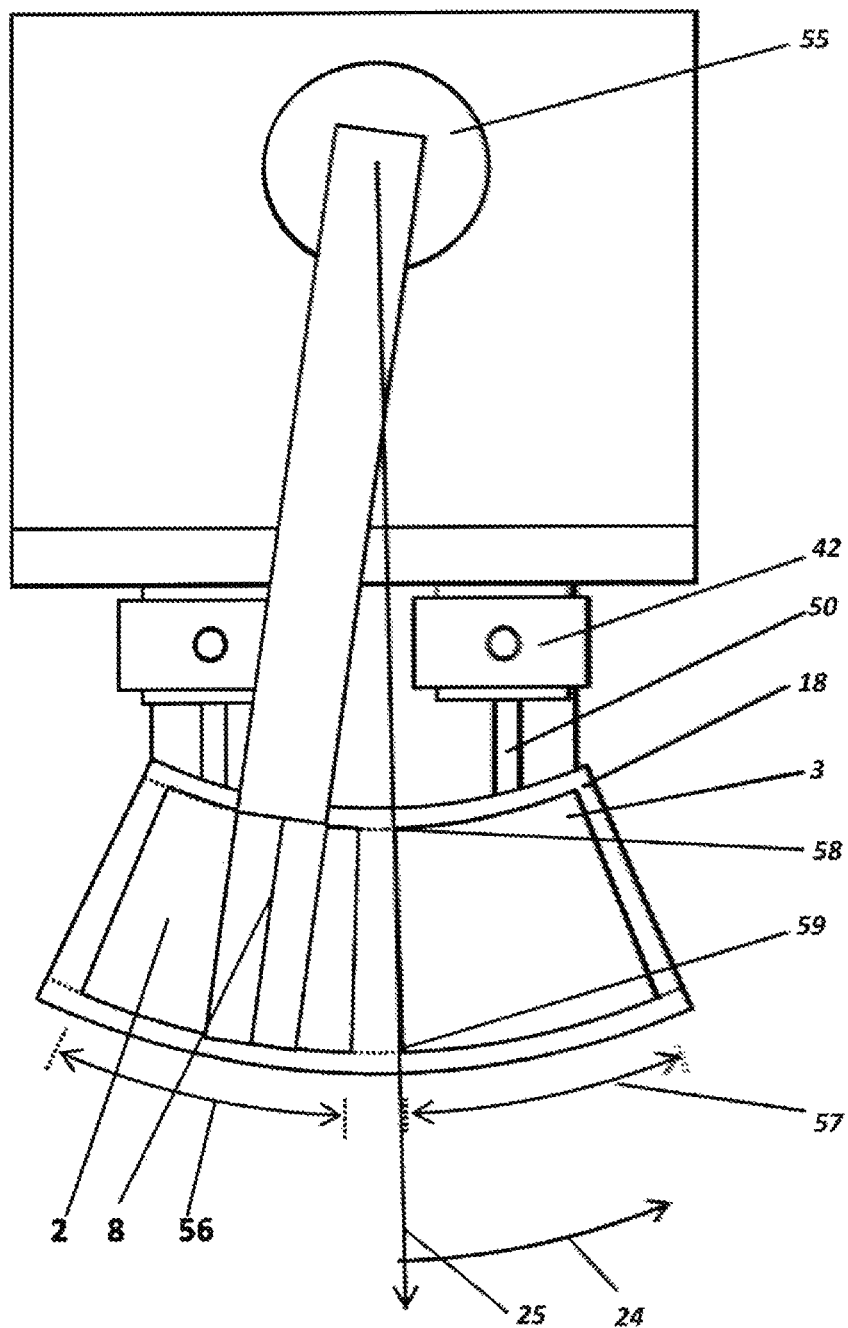
FIG. 14 is a schematic representation of an embodiment of the invention for explaining the powder supply to a circular movement of the doctor blade.

An example is shown in FIG. 14. The X coordinate is the angular coordinate (24) measured at the circle center point of the rotational movement. The Y coordinate is the radial coordinate (25), also measured from the center circle center point of the rotation. The rotary stage is labeled with the numeral 55. The building chamber has an angular extent $X_1$ (57), the powder reservoir chamber has an angular extent $X_2$ (58). In the example, both angular extents are the same size, the feeds $dZ_V$ and $dZ_B$ are also the same size, thus the powder supply function Q(Y) and the powder requirement function P(Y) equate. Both functions are rectangular functions, which have a constant, non-zero value between the radius values $Y_1$ (58) and $Y_2$ (59), scilicet it is the product of the angular extent $X_1$ and the feed $dz_V$.

Figure 2:
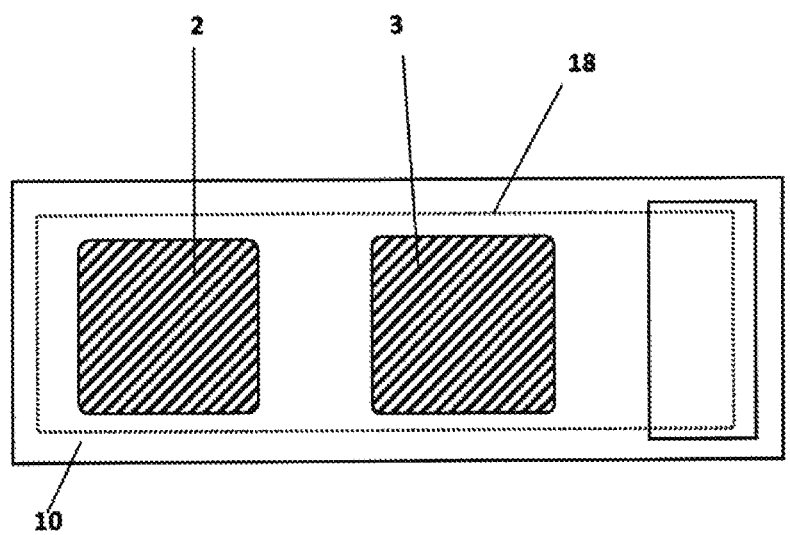
FIG. 2 shows a mounting base, powder reservoir chamber, building chamber and motion area according to the prior art.

Henceforth, a further preferred exemplary embodiment of the present invention will be explained in more detail with reference to FIGS. 15a to 15d. In the top view of FIG. 15a, the apparatus 200 according to the invention can be seen with the mounting base 210, the bottom element of the powder reservoir 204 and the bottom element of the building chamber 205 according to a first configuration/operating mode. In the figure, the bottom element of the powder reservoir 204' and the footprint of the building chamber plate 205' are shown in a broken line in accordance with a second configuration/operating mode (see also FIGS. 1 and 2).

Figure 15A:
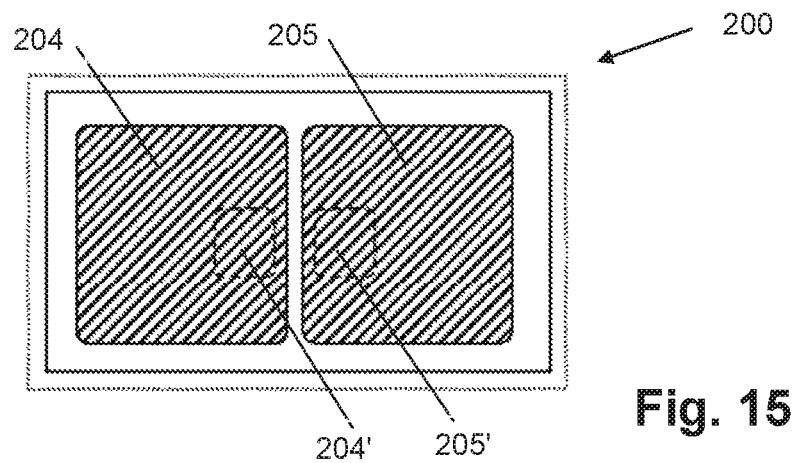
FIGS. 15a to 15d are schematic representations of an embodiment of the present invention in a top view in a first mode/configuration (FIG. 15a), a sectional view in a first mode/configuration (FIG. 15b), a sectional view in a second mode/configuration (FIG. 15c), and another top view in a second mode/configuration (FIG. 15d).
Figure 15B:
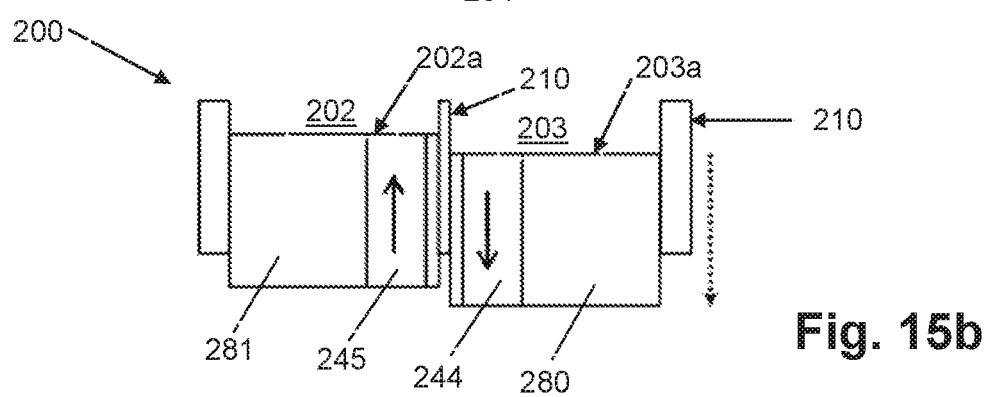

In FIG. 15b, the operation of the apparatus 200 is indicated in a longitudinal sectional view, namely a vertical movement of the bottom element of the powder reservoir 204 upward and a vertical movement of the bottom element of the building chamber 205 down. The powder reservoir chamber is labelled by the reference numeral 202 and the building chamber by 203. The bottom element of the powder reservoir 202 and the building chamber 203 are identified as 202 'or 203'. In this first configuration, the bottom element of the building chamber 205 is formed by core element of the bottom element of the building chamber 244 with a fitting element 280 attached thereto. Accordingly, the bottom element of the powder reservoir 204 is formed by the core element of the bottom element of the powder reservoir 245 with a fitting element 281 attached thereto. The bottom surface of the building chamber 203 is formed by the upper side 203a of the bottom element system 205; the lateral walls of the building chamber 203 are formed by the mounting base 210. Accordingly, the bottom surface of the powder reservoir 202 is formed by the upper surface 202a of the bottom element of the powder reservoir 204; the lateral walls of the powder reservoir 202 are formed by the mounting base 210. Excess powder (illustrated by the dotted arrow) is discharged as shown in the drawing rightmost down into a (not shown) powder collecting vessel.

Figure 15C:
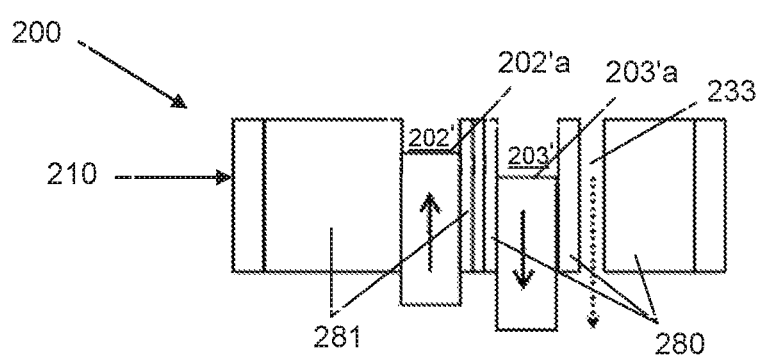

FIG. 15c now shows a longitudinal sectional view of a second configuration/mode of operation of the apparatus 200 after its conversion. The fitting elements 280 and 281 are no longer part of the bottom element of the building chamber 205 and the bottom element of the powder reservoir 204, respectively; they are also no longer connected to the core element of the bottom element of the building chamber 244 or the core element of the bottom element of the powder reservoir 245. Instead, 280 and 281 are fixedly connected to the main body 210 and each form side walls of the building chamber 202' and the powder reservoir chamber 203' in the second configuration. Therefore, building chamber 202' and powder reservoir chamber 203' of the second configuration are reduced in size compared to building chamber 202 and powder reservoir chamber 203 in the first configuration (FIG. 15b). The particular advantage of this type of building chamber size reduction, according to the invention, is that the full height of the chamber, e.g. building chamber and/or powder reservoir chamber, can be used in both configurations/operating modes. The fitting element 280 has an intentional gap or slot 233 through which excess powder (indicated by the dashed arrow) in the second configuration is discharged down into a powder collecting vessel (not shown). Preferably, the powder collecting vessel is located under both locations where powder is discharged so that the apparatus can be operated with one powder collecting vessel for both configurations. The doctor blade (not shown), therefore, in the second configuration, only has to travel up to the location of the gap 233 and can then reverse, which leads to a considerable time saving in production.

Figure 15D:
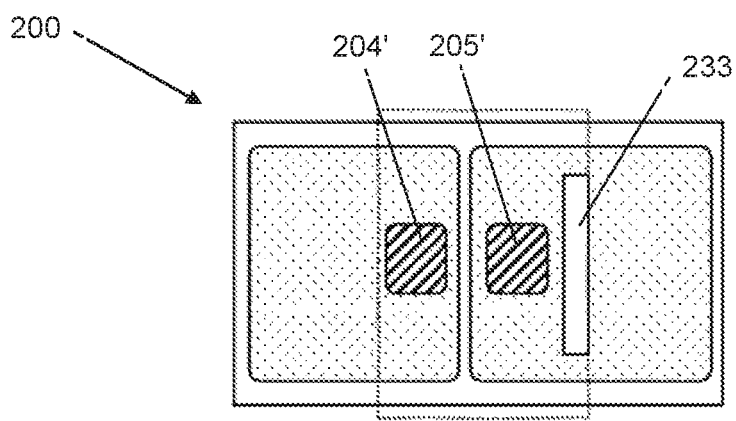

FIG. 15d illustrates a view corresponding to FIG. 15a, but for the second configuration shown in FIG. 15c.

Numerical example to quantify the advantages of the invention

The most important advantages of the invention are achieved in that as little powder as possible gets into the powder overflow vessel.

A) Investment Cost here is an example:

Building chamber no. 1 of a system has a volume of 100*100*20 mm, building chamber no. 2, which can be configured using the invention, has a volume of 15*15*20 mm. If the user does not have to fill the entire building chamber no. 1 with gold powder, his investment needs are reduced.

If a building chamber of (X*Y*Z) of, for example, 100 mm*100 mm*20 mm for the use of gold powder 15 mm*15 mm*20 mm is reduced, the investment requirement of gold powder decreases from 200 cm$^3$ to 4.5 cm$^3$, i.e. by approx. 98%. The saved about 195.5 cm$^3$ gold powder has a market price of about EUR 100,000 (as of September 2018).

B) Current Cost

Also, the size of the building plate, which must be made of the same material (in the example gold), will decrease accordingly; in this case from 100 cm$^2$ to 2.25 cm$^2$. In contrast to the powder, that can be reused after screening, the building plates are no longer useful after removal of the workpiece so they are disposed of or given to recycling. The initial purchase or re-purchase of reprocessed plates is expensive (high price difference). The cost is significantly reduced if smaller building plates are used.

In some cases, according to the state of the art, the powder from the powder overflow vessel is also completely disposed of or sent to a recycling plant in order to process only the highest quality fraction of the powder. Then high price difference also refers to the powder in the area of running costs. This additionally increases the running costs. That is why the cost saving potential is high.

The ongoing costs are also reduced by the lower inventory level, while storage must be carried out under exclusion of oxygen, and by lowered risks of theft.

C) Speed of the Generative Manufacturing Process

The span of time required for a generative manufacturing process is essentially made up from the span of time for irradiation and the span of time for moving the doctor blade and for the bottom elements of the building chamber and possibly of the powder reservoir chamber. Here is an example in three steps:

1. The footprint of the building chamber and the footprint of the powder reservoir of an apparatus are each 100 mm*100 mm.

A cuboid-shaped workpiece from steel of a size (X*Y*Z) 95 mm*95 mm*15 mm is designated to be built in layers of 25 μm. Inside the component, a honeycomb structure is built. The span of time for irradiation for one layer is 20 seconds (limited by the power of the laser). The track length of the doctor blade is 18 cm. The span of time for the primary and secondary movement of the doctor blade along this distance is 4 seconds in total. The bottom element of the powder reservoir is raised during the irradiation time. The bottom element of the building chamber is lowered simultaneously with the secondary movement of the doctor blade.

A span of time of 24 seconds is required per cycle. The number of layers is 800. The total time span for producing the workpiece is 5 h 20 min.

2. In this apparatus, a second cuboid-shaped workpiece of the size 10 mm*10 mm*15 mm, also with honeycomb structure, is designated to be built.

The time span for irradiation for one layer is reduced, proportionally to the surface to be irradiated, from 22 seconds to 22*(95*95)/(10*10)=0.221 seconds. The time for the primary and secondary movement of the doctor blade along the unchanged distance of 18 cm remains at 4 seconds. Thus, a span of time of 4.221 seconds is required per cycle. The total time span for producing the workpiece is 56 min 17 sec.

3. Consider now, the second workpiece is manufactured with a coater according to the invention, item C and item D, in a configuration with a building chamber of 15 mm*15 mm and a powder reservoir chamber of also 15 mm*15 mm. The powder reservoir chamber and the building chamber have a distance of 10 mm. The fitting element for the building chamber has a gap, so that the powder falls directly into a powder collecting vessel according to item 2. The path of the doctor blade is shortened to 5.0 cm.

The time span for irradiation for one layer is 0.221 seconds as under (2). The span of time for the primary and secondary movement of the doctor blade over the shortened distance of 5 cm is shortened to 1,111 seconds. Thus, a span of time of 1.332 seconds is needed per cycle. The time span for producing the workpiece is then a total of 17 min 46 sec instead of 56 min 17 sec due to the time saved for moving the doctor blade.

The invention leads to a significantly reduced time for producing the workpieces in the configuration of size-reduced footprints of the building chamber. This happens even if, as in the example, when in a configuration when the whole building chamber is fully used, not the movement time for the doctor blade but the power of the laser limits the irradiation time.

The time saving in the example is almost 40 minutes. In addition, we estimate another time saving of 3 minutes in a manual operation, because the amount of powder that has to be manually screened out is reduced by 98%.

The invention can also be summarized as follows:

A Coater for SLM or SLS, in which various building chambers can be configured

B Coater according to item A, in which powder falling through gaps in any of the configured building chambers is collected into a powder collecting vessel C Coater according to item B, wherein the powder collecting vessel is the only active powder collecting vessel with the coater D Coater according to one or more of items A-C, which has a cut-out for the building chamber whose footprint is greater than that of the largest building chamber and in which the configuration is carried out using fitting elements for the building chamber, which stand still relative to the mounting base of the coater in the intended mounting position.

E Coater according to one or more of items A-C,

In which the configuration is carried out using fitting elements for the building chamber, which stand still in the intended mounting position relative to the mounting base of the coater In which the configuration of the largest building chamber no fitting element is used F (outside the classification)

Coater according to one or more of items A-E, wherein the coater has a bottom element, which forms a tightly closing building chamber unit with the largest building chamber and each fitting element for the bottom element of the building chamber forms a tightly closing building chamber unit, together with one of the remaining building chambers, when it is placed on the of the bottom element of the building chamber G coater according to one or more of items A-E, wherein the coater has a core element of the bottom element of the building chamber and different shapes of the bottom element of the building chamber can be configured by fitting element for the bottom element of the building chamber which are fixed in the intended mounting position relative to the core element of the bottom element of the building chamber.

H Coater according to item G,
in which the core element of the bottom element of the building chamber forms a tightly closing building chamber unit, together with the smallest building chamber.

I Coater according to item G or H,
wherein at least one of the fitting elements for the building chamber and one of the fitting element for the bottom element of the building chamber is the same element J Coater according to one or more of items A-I,
wherein at least one of the footprints of the building chamber is customized to the geometry of a workpiece of specified shape K Scaling of the powder supply depending on the building chamber,
to be applied to a coater according to one or more of items A-J.

L Coater according to one or more of items A-J,
in which different footprints of the powder reservoir can be configured M Coater according to one or more of items A-J or L,
in which the powder requirement functions of at least two footprints of the building chambers have constant ratios to each other.

The invention has been explained in more detail above with reference to preferred embodiments thereof. However, it will be apparent to those skilled in the art that various modifications and changes can be made without departing from the basic ideas of the invention.

LIST OF REFERENCE NUMERALS 1 top powder layer in the building chamber
2 powder reservoir chamber
3, 3a, 3b, 3c building chamber
4 bottom element of the powder reservoir
5 bottom element of the building chamber
6 powdery material, shown hatched
7 powder collection
8 doctor blade
9 coater
10 mounting base
11 powder overflow vessel
12 building plate
13a, 13b intersecting plane
14 a workpiece, or a plurality of workpieces
15 primary movement of the doctor blade
18 motion area
24 X dimension
25 Y dimension
26 Z dimension
30 cut-out for the building chamber
31, 31a, 315, 310 fitting element for the building chamber
33 deliberate gap
34 preferred mounting area for the fitting element for the building chamber
38a, 38b fitting element for the powder reservoir
40 elbow connector
41 hook retainer system
42 linear bottom element with motor
43 powder trap
44 core element of the bottom element of the building chamber
48 falling powder
49 combined powder collecting and powder overflow vessel
50 retainer of the fitting element for the building chamber
51 compensation element
52 lines for tracing between side view and top view
55 rotary stage for the doctor blade
56 angular extent of the powder reservoir
57 angular extent of the building chamber
58 radius value Y1
59 radius value Y2
60, 60a fitting element for the bottom element of the building chamber
61 retainer against gliding off of the fitting element for bottom element of the building chamber
71 height of the building chamber
72 half the height of the building chamber
73 screw connection
80 dual function fitting element
81 electromagnet, inactive
82 electromagnet, active
90 exterior form drawing
91 line
92 curved line
93 end point of a line or curved line
100 building chamber 1
101 building chamber 2
102 powder supply function for building chamber 1
103 powder supply function for building chamber 2
104 coordinate system: to the right Y, to the top the powder requirement function
105 length of the building chamber 2 at location $Y_0$
106 location $Y_0$
107 function value $Q_1$
108 function value $P_1$
110 scaling arrows
111 scaled powder supply function
112 middle plateau
200 apparatus
202, 202' powder reservoir chamber
203, 203' building chamber
202a, 202'a bottom element of the powder reservoir
203a, 203'a bottom element of the building chamber
210 mounting base or main body
233 gap
244 core element of the bottom element of the building chamber
245 core element of the bottom element of the powder reservoir
280 fitting element (of the building chamber)
281 fitting element (of the powder reservoir)

What is claimed is:

1. An apparatus for selective laser melting and/or laser sintering, comprising:
a mounting base with at least one chamber having a first configuration and a second configuration; and
one or more fitting elements located in the at least one chamber,
wherein the at least one chamber is a building chamber and/or a powder reservoir chamber,
wherein, in the first configuration of the at least one chamber, each of the one or more fitting elements is vertically movable relative to the mounting base and, in the second configuration of the at least one chamber, each of the one or more fitting elements is fixedly connected to the mounting base,
wherein the at least one chamber comprises lateral walls,
wherein, in the first configuration of the at least one chamber, the mounting base forms the lateral walls of the at least one chamber,
wherein, in the second configuration of the at least one chamber, a side of each of the one or more fitting elements, which is a lateral side in an intended mounting position of each of the one or more fitting elements, forms a lateral wall of the at least one chamber, and wherein the at least one chamber is a tightly closing chamber in both the first configuration and the second configuration of the at least one chamber.

2. The apparatus according to claim 1, wherein, in the first configuration of the at least one chamber, a side of each of the one or more fitting elements, which is a top side in an intended mounting position of each of the one or more fitting elements, forms a bottom surface of the at least one chamber.

3. The apparatus according to claim 2, wherein, in the second configuration of the at least one chamber, the bottom surface of the building chamber is vertically movable relative to each of the one or more fitting elements.

4. The apparatus according to claim 1,
wherein the at least one chamber is the building chamber, and
wherein, in the second configuration of the at least one chamber, each of the one or more fitting elements has a gap, which is a vertical gap in the intended mounting position of each of the one or more fitting elements that provides for drainage of excess powder.

5. The apparatus according to claim 4, wherein, in the first configuration of the at least one chamber, each of the one or more fitting elements has no vertical gap.

6. The apparatus according to claim 1, wherein, in the first configuration of the at least one chamber, an intended mounting position of each of the one or more fitting elements has a different orientation of each of the one or more fitting elements than an orientation of each of the one or more fitting elements in the intended mounting position in the second configuration of the at least one chamber.

7. The apparatus according to claim 1, wherein, in the first configuration of the at least one chamber, the mounting base exhibits walls of the at least one chamber.

8. The apparatus according to claim 1, wherein, in the second configuration of the at least one chamber, each of the one or more fitting elements forms at least one wall of the at least one chamber.

9. The apparatus according to claim 1, wherein, in the first configuration of the at least one chamber, the apparatus has a gap, which is a vertical gap in an intended mounting position for removing excess powder.

10. The apparatus according to claim 1, wherein the apparatus has first and second gaps which are located on a side of the building chamber facing away from the powder reservoir chamber.

11. The apparatus according to claim 10, wherein the apparatus further comprises a powder collecting vessel, which is located under the first and second gaps.

12. The apparatus according to claim 1, wherein, in the first configuration of the at least one chamber, a bottom element of the building chamber can be driven out vertically above the mounting base.

13. The apparatus according to claim 1, wherein, in both the first configuration and the second configuration of the at least one chamber, a height of the at least one chamber is the same.

* * * * *